US012068873B2

(12) United States Patent
Morrison et al.

(10) Patent No.: US 12,068,873 B2
(45) Date of Patent: Aug. 20, 2024

(54) DOMAIN AND INVITE MANAGEMENT IN A GROUP-BASED COMMUNICATION SYSTEM

(71) Applicant: Salesforce, Inc., San Francisco, CA (US)

(72) Inventors: Andrew S. Morrison, Brooklyn, NY (US); Tatiana Petkova, San Francisco, CA (US); Colin Gibbs, Brooklyn, NY (US); Arthur Chi, Oakland, CA (US); Yian Lo, San Francisco, CA (US); Ji Kim, Los Angeles, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/861,025

(22) Filed: Jul. 8, 2022

(65) Prior Publication Data
US 2024/0015040 A1    Jan. 11, 2024

(51) Int. Cl.
*H04L 12/18* (2006.01)
*H04L 61/45* (2022.01)
*H04L 101/37* (2022.01)

(52) U.S. Cl.
CPC ...... *H04L 12/1818* (2013.01); *H04L 61/4547* (2022.05); *H04L 2101/37* (2022.05)

(58) Field of Classification Search
None
See application file for complete search history.

(56) References Cited

U.S. PATENT DOCUMENTS

| 8,582,743 | B2* | 11/2013 | Teng | H04M 7/0054 |
| | | | | 370/260 |
| 9,876,743 | B1* | 1/2018 | Vippagunta | H04L 51/56 |
| 11,089,095 | B1* | 8/2021 | Henkens | H04L 67/1051 |
| 2009/0157693 | A1* | 6/2009 | Palahnuk | G06Q 30/0273 |
| | | | | 707/999.102 |
| 2018/0287982 | A1 | 10/2018 | Draeger et al. | |

(Continued)

OTHER PUBLICATIONS

"Die, Email, Die! a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Mohamed Ibrahim
(74) *Attorney, Agent, or Firm* — Holland & Hart LLP

(57) ABSTRACT

Methods, systems, apparatuses, devices, and computer program products are described. A group-based communication system may support domain and invite management, for example, for a group-based communication channel. A first user may create a channel invite and may add an email address for a second user to the invite. The second user may have multiple accounts in the group-based communication system. The system may determine that the domain of the second user's email address has an organization configured as the primary organization for the domain, and the system may automatically configure the invite to correspond to an account for the second user that is associated with the domain's primary organization. The system may route the invite to the account associated with the primary organization and may send the invite (e.g., a channel invite to the group-based communication channel) to a second user device associated with the second user.

20 Claims, 12 Drawing Sheets

(56) References Cited

U.S. PATENT DOCUMENTS

2021/0319408 A1* 10/2021 Jorasch .............. G06Q 10/1095
2023/0297968 A1* 9/2023 Han ...................... H04L 51/046
                                                                               705/7.18

OTHER PUBLICATIONS

"How Slack changed the way we work by putting the customer experience first", Repeat Customer Podcast, Episode 3, [online] [retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014, 2:48 PM) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a819-4d7d-9573-89d9598a4963/?context=1000516> (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

DOMAIN AND INVITE MANAGEMENT IN A GROUP-BASED COMMUNICATION SYSTEM

TECHNICAL FIELD

The present disclosure relates generally to communication systems and data processing, and more specifically to domain and invite management in a group-based communication system.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

Users may communicate information using a communication platform (e.g., a group-based communication system, separate from or associated with the cloud platform). In some examples, the group-based communication system may support different groups of users sharing content within specific channels. In some cases, a user in the group-based communication system may have multiple accounts associated with a single email address. Inviting the user to a group (e.g., a channel, a messaging group) by sending an invite to the email address may allow the user to join the group using any account associated with the email address. In some examples, accepting the invite using a first account (e.g., a personal account) instead of a second account (e.g., a business account) may allow the user to access information within the group using an account that does not follow specific security protocols or parameters (e.g., protocols or parameters configured for the business account), potentially threatening security within the group-based communication system.

SUMMARY

The described techniques relate to improved methods, systems, devices, and apparatuses that support domain and invite management in a group-based communication system. The domain and invite management may improve system security and user experience associated with inviting users to channels, direct messaging (DM) groups, or both within the group-based communication system. For example, the group-based communication system may use primary organizations for email domains to route invites to specific user accounts within the system. The group-based communication system may additionally or alternatively send primary organization information for rendering in a user interface during invite creation such that a user creating the invite may confirm that recipients of the invite correspond to trusted primary organizations.

A first user may create an invite (e.g., a group-based communication channel invite, a DM invite) and may add an email address for a second user to the invite. In some examples, the second user may have multiple accounts associated with the same email address in the group-based communication system. The system may determine that the domain of the second user's email address has an organization configured as the primary organization for the domain. The system may automatically configure the invite to correspond to a specific account of the multiple accounts for the second user that is associated with the domain's primary organization. The system may route the invite to the specific account associated with the domain's primary organization and may send a message including the invite (e.g., a channel invite to the group-based communication channel, a DM invite to a messaging group) to a second user device associated with the second user. The second user may accept the invite for the specific account but may not accept the invite for a different account. For example, the group-based communication system may restrict the second user from accepting the invite using a different account other than the account associated with the primary organization for the second user's email domain to improve security associated with invitations in the system. In response to acceptance of the invite, the system may add the account associated with the primary organization to the channel or DM group, and the added account may follow security protocol and parameters for the primary organization.

DETAILED DESCRIPTION

Figure 1:
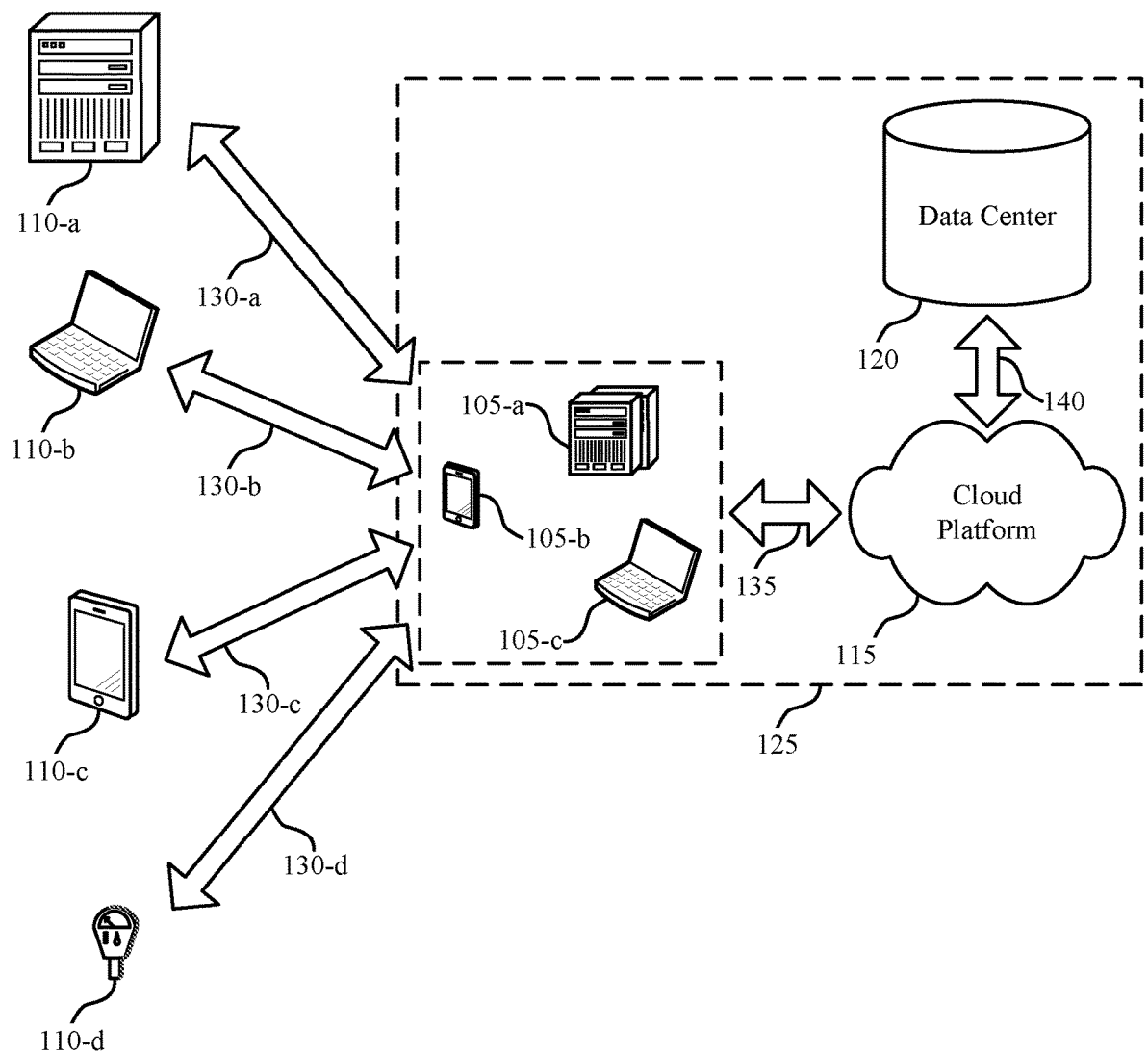
FIG. 1 illustrates an example of a system for cloud computing that supports domain and invite management in a group-based communication system in accordance with aspects of the present disclosure.

A group-based communication system may support multiple group-based communication channels, multiple direct messaging (DM) groups, or both. A group-based communication channel may provide a virtual space in which users of a group may communicate, for example, by posting messages, entering hangout meetings, performing calls, sharing files, or communicating using any other means. A DM group may provide a virtual space in which users invited to the DM group may communicate using text-based messages. In some cases, an organization (e.g., a tenant of a multi-tenant database system or another organization) may use multiple different channels, DM groups, or both within the group-based communication system. Additionally, the group-based communication system may support a user creating multiple accounts for the system associated with a same email address. For example, the user associated with the email address may create a personal account, a business account, a social account, or any combination of these or other types of accounts. Different accounts may be associated with different organizations in the group-based communication system. In some examples, an account may follow protocols, procedures, security policies, or any combination thereof corresponding to the organization associated with the account. If the user joins a channel or DM group using one account as opposed to another, the user may operate in the channel or DM group according to different protocols, procedures, security policies, or any combination thereof, resulting in potential security concerns for the channel or DM group.

Techniques described herein may support domain and invite management in a group-based communication system. For example, the group-based communication system may use primary organizations for verified email domains to reduce security risks associated with users using multiple accounts. The system may surface primary organization information during invite creation and may automatically route invites to specific user accounts to protect against users accepting invites (e.g., channel invites, DM invites, DM group invites) using untrusted accounts (e.g., accounts that may not follow protocols, procedures, security policies, or any combination thereof configured for a primary organization owning, creating, or otherwise configuring the relevant channel or DM group).

In some examples, a first user may create an invite (e.g., a channel invite, a DM group invite) and may add an email address for a second user to the invite. The second user may have multiple accounts in the group-based communication system. The system may determine that the domain of the second user's email address has an organization configured as the primary organization for the domain. The system may automatically associate inviting the second user's email address with inviting a specific account for the second user that corresponds to the primary organization for the domain. The system may send, for rendering at a user device of the first user, an indication of the primary organization for the second user's email domain. The first user creating the invite may refrain from sending the invite until the user views the indication of the primary organization and confirms that the invite will be sent to the second user's account corresponding to the primary organization.

If the first user sends the invite, the group-based communication system may automatically route the invite to go to the second user's account corresponding to the primary organization. For example, the system may send, for rendering at a user device of the second user, a message including the invite and providing a means for the second user to accept the invite. The system may refrain from providing the second user options for selecting on which account to accept the invite. Instead, if the second user accepts the invite, the system may automatically correlate the acceptance of the invite with the second user's account corresponding to the primary organization. As such, the system may add this account for the second user to the channel or DM group indicated in the invite. Because the added account is associated with the primary organization, the added account may be configured with security settings based on a configuration of the primary organization. Additionally, the system may restrict the second user from accepting the invite using a different account that could potentially allow the second user to avoid or ignore the security settings for the primary organization.

Aspects of the disclosure are initially described in the context of group-based communication systems. Additional aspects of the disclosure are described with reference to user interfaces and a process flow. Aspects of the disclosure are further illustrated by and described with reference to apparatus diagrams, system diagrams, and flowcharts that relate to domain and invite management in a group-based communication system.

FIG. 1 illustrates an example of a system 100 for cloud computing that supports domain and invite management in a group-based communication system in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, the system 100 may further support a group-based communication system. For example, a group-based communication system may provide a platform for users to communicate within groups defined by group-based communication channels or DM groups. The group-based communication system may leverage one or more aspects of the subsystem 125. For example, data objects stored in the data center 120, the cloud platform 115, or both may be accessed or otherwise referenced within a channel of the group-based communication system. Additionally or alternatively, the cloud platform 115 may support a group-based communication platform.

A group-based communication system may support domain and invite management, for example, for a group-based communication channel. A first user may create a channel invite and may add an email address for a second user to the invite. The second user may have multiple accounts in the group-based communication system. The system may determine that the domain of the second user's email address has an organization configured as the primary organization for the domain, and the system may automatically configure the invite to correspond to an account for the second user that is associated with the domain's primary organization. The system may route the invite to the account associated with the primary organization and may send the invite (e.g., a channel invite to the group-based communication channel) to a second user device associated with the second user. Accepting the invite at the second user device may add the second user's account associated with the primary organization to the group-based communication channel.

Some other systems implement invites that may be flexibly accepted using multiple accounts. For example, if a user has created multiple accounts for an email address and receives an invite at the email address in an email application, the user may log into any of the accounts for the email address to accept the invite. Because different accounts may be configured with different security settings (e.g., access policies, retention policies, sharing capabilities, editing capabilities), such systems may fail to ensure that a user accepting an invite (e.g., a channel invite) will operate in the channel according to specific security policies. Additionally, or alternatively, an invite may be accidentally sent to an incorrect user, potentially granting the incorrect user access to information (e.g., confidential information within the channel).

In contrast, the system 100 may support domain verification and invite management to protect information in the group-based communication system. For example, the group-based communication system may use primary organizations for verified email domains to reduce security risks associated with users accepting invites using untrusted accounts. The system 100 may surface primary organization information during invite creation to allow the user creating the invite to visually confirm that one or more intended recipients of the invite are members of a trusted primary organization (e.g., the same organization as the user creating the invite, the same organization that owns the channel). Additionally, or alternatively, the system 100 may route an invite to a specific user account associated with a primary organization to protect against a user with multiple accounts from accepting the invite using an untrusted account (e.g., an account unassociated with the primary organization and—correspondingly—not configured with the same security settings as the primary organization).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
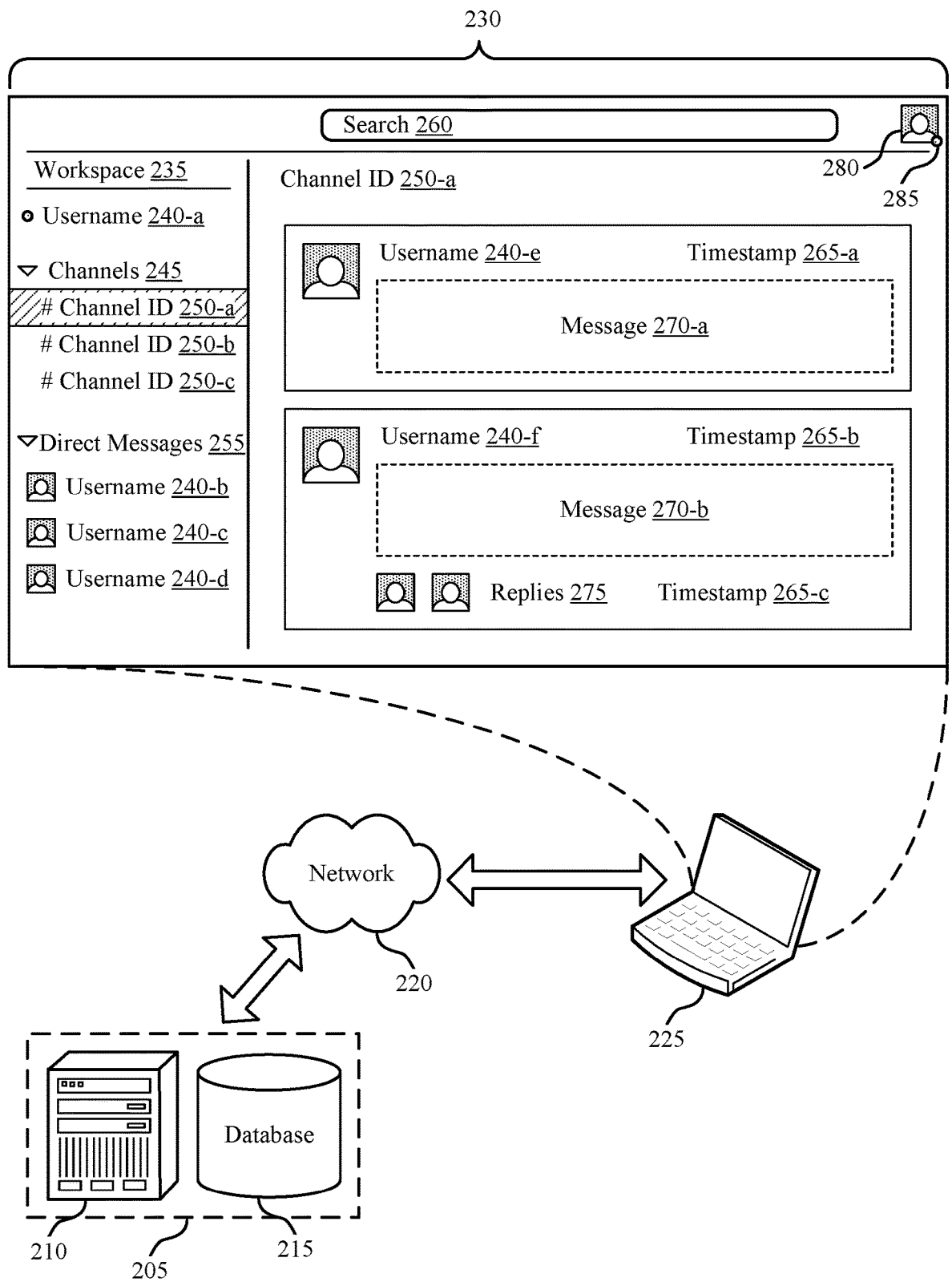
FIGS. 2 and 3 illustrate examples of group-based communication systems that support domain and invite management in a group-based communication system in accordance with aspects of the present disclosure.

FIG. 2 illustrates an example of a group-based communication system 200 that supports domain and invite management in a group-based communication system in accordance with aspects of the present disclosure. The group-based communication system 200 may be implemented as part of or with a system 100. For example, the group-based communication system 200 may leverage data stored at a cloud platform 115, a data center 120, or some combination thereof. The group-based communication system 200 may include a group-based communication platform 205 hosted by one or more computing devices 210, databases 215, or a combination thereof. The group-based communication system 200 may support displaying data to a user via a user interface 230 of a user device 225. In some examples, the user device 225 may communicate with the group-based communication platform 205 via a network 220. In some cases, the user device 225 may be an example of a cloud client 105 or a contact 110 in a system 100, as described with reference to FIG. 1.

The group-based communication platform 205 may leverage a network-based computing system to enable users of the group-based communication platform 205 to exchange data. By being "group-based," the platform may support communication channels, messages, virtual spaces, or a combination thereof organized into groups of users. The group-based communication platform 205 may include security policies or features that define access to resources (e.g., channels, messages, files) according to such groups. In some examples, the groups of users may be defined by group identifiers (IDs), which may be associated with common access credentials, domains, or the like. In some examples, the group-based communication platform 205 may provide a virtual space enabling users to chat, meet, call, collaborate, transfer files or other data, or otherwise communicate within groups. In some examples, a group may be associated with a workspace 235, enabling users associated with the group to communicate within the group in a secure and private virtual space. In some cases, members of a group or a workspace may be associated with a same organization (e.g., a tenant of a multi-tenant database system). In some other cases, members of a group or a workspace may be associated with different organizations (e.g., entities with different organization IDs, such as different tenants in a multi-tenant database system).

One or more computing devices 210 may support the group-based communication platform 205. For example, the one or more computing devices 210 may include an application server, a database server, a cloud-based server or service, a worker server, a server cluster, a virtual machine, a container, or any combination of these or other computing devices supporting data processing. For example, the one or more computing devices 210 may include one or more processors, memory, computer-readable media, or a combination thereof. The one or more computing devices 210 may perform functions and provide features as described herein with respect to the group-based communication platform 205. The group-based communication platform 205 may further include one or more databases 215, which may include cloud-based data storage, physical data storage, or both. In some cases, the one or more databases 215 may be memory components of the one or more computing devices 210. The one or more databases 215 may store data associated with the group-based communication platform 205. For example, the one or more databases 215 may include data relating to channels, users, workspaces 235, or any combination thereof, logs of messages 270, security information, or any other information relevant to the group-based communication platform 205.

A user may access the group-based communication platform 205 using a user device 225. The user device 225 may be an example of a laptop, a desktop computer, a smartphone, a tablet, a smart device, or any other device operated by a user and including a user interface 230. The user device 225 may communicate with the group-based communication platform 205, for example, via a network 220. The network 220 may be any type of communication network, such as a local area network or a wide area network, the Internet, a wireless network, a cellular network, a local wireless network, Wi-Fi, Bluetooth®, Bluetooth Low Energy (BLE), Near Field Communication (NFC), a wired network, or any combination of these or other networks. The network 220 may support proper network protocols for transferring data between the user device 225 and the group-based communication platform 205. For example, the user device 225, the group-based communication platform 205, or both may apply one or more security protocols (e.g., encryption) for securely transferring data over the network 220. In some cases, one or more aspects of the group-based communication platform 205 may be implemented at the user device 225. For example, the user device 225 may download an application corresponding to the group-based communication platform 205 and may store information relating to the group-based communication platform 205 locally at the user device 225. In some other examples, the user device 225 may access the group-based communication platform 205 in a web browser.

The user device 225 may include a user interface 230 that may display information relating to the group-based communication platform 205. Additionally, a user may interact with the user interface 230 to communicate with other users, view data, modify data, or otherwise perform actions associated with the group-based communication platform 205. The group-based communication platform 205 may support multiple group-based communication channels, and the user interface 230 may display information relating to a group-based communication channel corresponding to a channel ID 250-$a$. The user interface 230 may display a sidebar including navigation information for a user and a central pane (e.g., a main pane) including the channel contents, such as a sequential listing of messages 270 corresponding to the channel ID 250-$a$. A channel (e.g., a group-based communication channel) may provide a virtual space for a group of users to communicate via messages, hangouts, video or audio calls, files, or any other means of communication. The group of users may include members of the channel, non-members of the channel with access to the channel, or both.

A user may log into the group-based communication platform 205 (e.g., using a username 240-$a$, a password, or both corresponding to a user account). In response to the user logging in, the group-based communication platform 205 may send, for display in the user interface 230, data corresponding to the user (e.g., corresponding to an account for the user). For example, the user may be associated with a specific workspace 235, a set of channels 245, a set of connections, a set of threads, a set of direct messages 255, or any combination of these. The user device 225 may retrieve or otherwise access the relevant information for the user (e.g., based on the username 240-$a$ or another user ID) and surface the information for display in the user interface 230 according to a display format.

As an example, in a sidebar (e.g., a navigation pane), the user interface 230 may display an indication of a workspace 235 corresponding to the user and the username 240-$a$ of the user. The sidebar may further include indications of a set of channels 245 using the respective channel IDs. For example, the set of channels 245 may include the channels to which the user is a member. As illustrated, the set of channels 245 may include a first channel corresponding to a first channel ID 250-$a$, a second channel corresponding to a second channel ID 250-$b$, and a third channel corresponding to a third channel ID 250-$c$. It is to be understood that the set of channels 245 may include any quantity of channels for selection by the user. The user may select a channel from the listing of the set of channels 245, and the user interface 230 may display the selected channel (e.g., the messages 270 associated with the selected channel) in the central pane. The sidebar may further include a set of direct messages 255 between the user with the username 240-$a$ and one or more other users (e.g., in a DM group). For example, the set of direct messages 255 may include the usernames 240 (or nicknames) of the users communicating via direct messages with the user. In some examples, the list of users may include users added by the user with username 240-$a$, users who have current, ongoing direct message conversations with the user with username 240-$a$, or both. As illustrated, the set of direct messages 255 may include indications of a user with a first username 240-$b$, a user with a second username 240-$c$, and a user with a third username 240-$d$, although any quantity of users may be included in the set of direct messages 255. Selecting a username 240 from the set of direct messages 255 may cause the user interface 230 to display a set of direct messages between the logged in user and the selected user or group of users in the central pane (e.g., direct messages that are stored in the system and displayed in a sequential order).

The central pane of the user interface 230 may display the contents of a selected channel. For example, if the user selects a channel with a channel ID 250-a, the central pane may display the selected channel ID 250-a, as well as data corresponding to this selected channel ID 250-a. The data for the channel may include a sequential listing of messages 270 posted to the channel. For example, a user with a username 240-e may post a first message 270-a at a first time corresponding to a timestamp 265-a. The user interface 230 may display, for the channel, this information, as well as affordances supporting actions associated with this information. For example, a user may react to the message 270-a, reply to the message 270-a, or both. As illustrated, another user with a username 240-f may post a second message 270-b at a time corresponding to a timestamp 265-b, and one or more users may reply to the message 270-b. The user interface 230 may indicate a set of replies 275 and one or more timestamps 265-c associated with the replies 275 (e.g., a timestamp 265-c corresponding to a most recent reply) with the message 270-b. Selecting the set of replies 275 may cause the user interface 230 to display the replies in a second sidebar (e.g., as a thread of messages).

The messages 270 may include text or other objects, such as files, photos, audio files, video files, documents, uniform resource locator (URL) links, or any other objects. If the selected channel is private, a member of the channel may view the information related to the channel, while nonmembers of the channel may be blocked from viewing the information.

If the selected channel is public, members and nonmembers of the channel may view the relevant information. In some cases, channels, users, workspaces 235, accounts, or some combination thereof may include accessibility settings or rules which may define viewing capabilities, editing capabilities, or both.

The user interface 230 may further support search functionality using a search bar 260. Additionally, or alternatively, the user interface 230 may indicate a profile picture 280 of the currently logged in user, as well as a connection status 285 (e.g., online, offline, busy) of the user.

In some examples, a user (e.g., a first user) may invite one or more other users to join a channel (e.g., a channel with a channel ID 250-a). In some cases, channel invites may be associated with email addresses. For example, the first user creating the invite may select a specific email address to add a second user corresponding to the email address to the channel. Additionally, or alternatively, the first user may select a specific username (e.g., the username 240-c) for the second user to invite to the channel, where the username corresponds to an email address. If the first user sends the channel invite, the channel invite may be sent, via an email message, to the email address of the invited user (e.g., the second user). The invited user may view the channel invite using an email application.

In some cases, the second user may have created multiple accounts with the group-based communication platform 205. For example, different accounts for the second user may correspond to the same email address but different usernames, passwords, workspaces 235, organizations, or any combination thereof. If the second user accesses the channel invite using the email application, the second user may view the channel invite in an environment unassociated with a specific account for the group-based communication platform 205 (e.g., an environment instead associated with an email account for the email application corresponding to the email address). To block or otherwise refrain from supporting the second user from selecting which account for the group-based communication platform 205 to use for accepting the channel invite, the group-based communication platform 205 may automatically configure the channel invite to be associated with a specific account. For example, the invited user's email address may correspond to an email domain. The group-based communication platform 205 may store (e.g., in a database 215) domain information for multiple organizations (e.g., workspaces 235), where an organization (e.g., a workspace 235) may claim the email domain and—if the organization (e.g., workspace 235) is verified as owning the email domain—may set a primary organization (e.g., a primary workspace 235 or other primary identifier) for the email domain. The group-based communication platform 205 may associate the channel invite with the invited user's account corresponding to the primary organization for the invited user's email domain.

If the second user accepts the channel invite via the email application, the group-based communication platform 205 may add the second user's account corresponding to the primary organization as a member of the channel (e.g., the channel with the channel ID 250-a). The second user may access the channel with the channel ID 250-a if the second user is logged into the group-based communication platform 205 with the account corresponding to the primary organization. However, the group-based communication platform 205 may refrain from granting the second user access to the channel with the channel ID 250-a if the second user is logged into the group-based communication platform 205 with a different account. Accordingly, when the second user accesses the channel with the channel ID 250-a, the group-based communication platform 205 may apply security settings for the primary organization to the second user based on the second user being logged in with the account corresponding to the primary organization.

Figure 3:
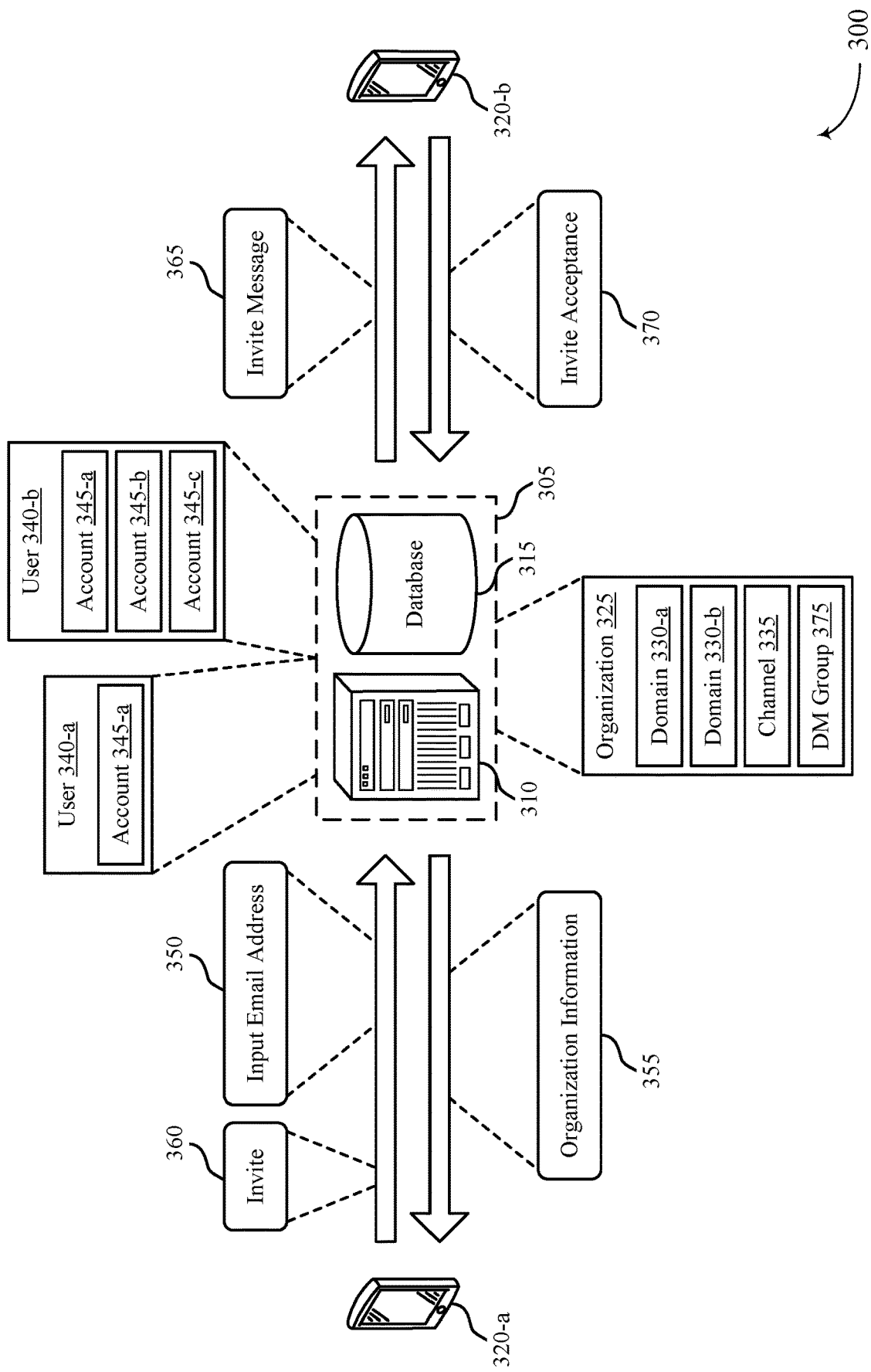

FIG. 3 illustrates an example of a group-based communication system 300 that supports domain and invite management in a group-based communication system in accordance with aspects of the present disclosure. The group-based communication system 300 may be implemented as part of or with a system 100 or a group-based communication system 200 as described with reference to FIGS. 1 and 2. For example, the group-based communication system 300 may include a group-based communication platform 305 hosted by one or more computing devices 310, databases 315, or a combination thereof, which may be examples of the corresponding devices described with reference to FIG. 2. The group-based communication system 300 may support a user device 320-a and a user device 320-b accessing the group-based communication platform 305, where the user device 320-a and the user device 320-b may be examples of a user device 225 as described with reference to FIG. 2. In some examples, operations described herein with reference to the group-based communication platform 305 may alternatively be performed locally at the user device 320-a, the user device 320-b, or both. The group-based communication system 300 may route invites to specific accounts based on primary organizations.

In some examples, the group-based communication platform 305 may support an application that provides connection between multiple workspaces with a container of an organization 325 (e.g., a top-level team). The application may allow sharing of group-based communication channels 335 across workspaces, for example, within the organization 325. In some cases, a connection tool may support client communications for an organization 325 within channels 335. The group-based communication platform 305 may provide security for such communications within the platform. In some examples, users may be invited to create an account within the group-based communication platform 305 based on receiving an invite to join a channel 335.

A first user 340-*a* using the connection tool may invite one or more customers, partners, vendors, or any other users to collaborate with the first user 340-*a* or other members of a team within the group-based communication platform 305. The group-based communication platform 305 may include features to control which users may be invited to join a channel 335 to keep the group-based communication platform 305 environment secure. For example, the group-based communication platform 305 may configure an invite 360 to ensure the invite 360 is accepted by the intended user and user account.

A first user 340-*a* may operate a first user device 320-*a* to access the group-based communication platform 305. The first user 340-*a* may have an account 345-*a* in the group-based communication platform 305. The first user 340-*a* may select an option to create an invite 360 for one or more other users to join a group-based communication channel 335 or a DM group 375 in the group-based communication platform 305. The group-based communication platform 305 may send, for rendering in a user interface of the first user device 320-*a*, an invite interface (e.g., a window supporting preparing and sending a channel invite). In the invite interface, the first user 340-*a* may enter one or more email addresses for one or more other users to invite to a channel 335, a DM group 375, or both. For example, the first user 340-*a* may enter an email address for the second user 340-*b*. The user device 320-*a* may send the input email address 350 for the second user 340-*b* to the group-based communication platform 305.

The group-based communication platform 305 may store (e.g., at one or more databases 315) account information for users, organization information for organizations, or both. For example, the group-based communication platform 305 may store information relating to an organization 325. In some cases, the organization 325 may correspond to—or be an example of—a workspace within the group-based communication platform 305. Additionally, or alternatively, the organization 325 may be an example of a tenant in a multi-tenant database system. The organization 325 may claim one or more domains (e.g., email domains, web domains) owned by the organization 325. For example, the organization 325 may claim and verify that a first domain 330-*a*, a second domain 330-*b*, or both are owned by the organization 325. In some examples, a user (e.g., an administrative user) may configure the organization 325 as the primary organization for one or more of the domains. For example, the organization 325 may be set as the primary organization for the domain 330-*a*. Additionally, or alternatively, the group-based communication platform 305 may manage one or more channels 335 for the organization 325 (e.g., within the workspace of the organization 325), one or more DM groups 375 for the organization 325 (e.g., within the workspace of the organization 325), or both.

The group-based communication platform 305 may allow a user to create multiple accounts within the system (e.g., corresponding to different workspaces or organizations 325). For example, the second user 340-*b* may have a first account 345-*a*, a second account 345-*b*, and a third account 345-*c* in the group-based communication platform 305. The email address for the second user 340-*b* may be associated with multiple accounts and, correspondingly, multiple workspaces. In some examples, the second user 340-*b* may claim one or more email aliases, such that multiple email addresses correspond to the second user 340-*b*, and the group-based communication platform 305 may track accounts for multiple email addresses associated with the same user 340-*b*.

If an invite 360 is unassociated with a specific organization 325 (e.g., a specific workspace), and the invite 360 is sent to the email address of the second user 340-*b* associated with multiple workspaces, the second user 340-*b* could accept the invite 360 using any of the multiple workspaces, or may create a new account associated with a different workspace to accept the invite 360. Additionally, or alternatively, if the invite 360 is configured to support a full access connection, the second user 340-*b* could forward the invite 360 to be accepted by a different user (e.g., a third user) with a different email address that may be associated with any workspace. An invite 360 unassociated with an organization 325 (e.g., a workspace) may fail to control which users are invited to a channel 335 or DM group 375, may fail to confirm for the inviter (e.g., the first user 340-*a*) that the invite 360 is being sent to a user in the intended organization 325 (e.g., a trusted organization 325), or both.

To support improved security for invites 360, the group-based communication platform 305 may track primary identities which map email domains (e.g., for email addresses) to organizations 325 or workspaces within the group-based communication platform 305. A user with an account with an email domain that is mapped to a primary organization 325 may have that organization 325 as the user's primary identity. The group-based communication platform 305 may use the primary identity for a user to autocomplete an invitation flow if the user's email address is input for an invite 360. For example, although the second user 340-*b* may have multiple accounts (e.g., the account 345-*a*, the account 345-*b*, and the account 345-*c*), the second user's email address may have an email domain 330-*a* which is mapped to the organization 325 (e.g., the organization 325 is configured as the primary organization for the domain 330-*a*). Accordingly, the primary identity for the second user 340-*b* may be mapped to the organization 325 (e.g., the primary organization for the second user's email domain 330-*a*). If the first user 340-*a* adds the second user 340-*b* to an invite 360 (e.g., by inputting the second user's email address), the group-based communication platform 305 may automatically associate the invite 360 with the organization 325 and may route the invite 360 to a specific account for the second user 340-*b* that is associated with the organization 325. For example, the account 345-*b* may be created for the organization 325 (e.g., the account 345-*b* may be within a workspace of the organization 325), while the account 345-*a* and the account 345-*c* may correspond to different organizations, workspaces, or both. Associating the invite 360 with the organization 325, the specific account 345-*b*, or both may ensure the second user 340-*b* does not accept the invite using the account 345-*a* or the account 345-*b* or forward the invite to be accepted by a different user or account.

Additionally, or alternatively, the group-based communication platform 305 may use the primary identities to grant administrative users control over which users may be invited to a channel 335 or DM group 375. In some cases, an administrative user may configure a set of trusted partners and the system may support a user inviting other users with accounts with at least one of the trusted partners. For example, an invite 360 may be sent to a user account associated with a trusted partner, and the group-based communication platform 305 may refrain from sending invites 360 to user accounts associated with untrusted partners. In some examples, the administrative user may add or remove email domains as trusted partners to manage invite permissions. In some cases, the administrative user may select whether to limit invites 360 to trusted partners. Other users may submit requests to add additional trusted partners or remove trusted partners from the list. Restricting invites 360 to trusted partners may replace using manual approval of user invites or invite acceptances, for example, by one or more administrative users. Alternatively, the process may be used in addition to manual approval by one or more administrative users.

The group-based communication platform 305 may additionally or alternatively provide organization information 355 to improve the user experience for inviting users. For example, when the group-based communication platform 305 receives an indication of an input email address 350, the group-based communication platform 305 may determine a primary identity for the corresponding user (e.g., the second user 340-b) and may send organization information 355 to the first user device 320-a for display in the invite creation window. The organization information 355 may indicate the primary organization for the second user's primary identity. For example, the window may autocomplete one or more fields to display the organization information 355, such as an organization icon, an organization name, a workspace icon, a workspace name, or any other identifying information for the organization 325 configured as the primary organization for the second user's email domain 330-a. In some cases, a user may opt out of retrieving this organization information 355.

If the first user 340-a confirms that the organization information 355 indicates an intended organization (e.g., a trusted organization, an organization satisfying a threshold security level), the first user 340-a may send the invite 360. The group-based communication platform 305 may send the invite 360 (e.g., in an invite message 365) for rendering in a user interface of the second user device 320-b operated by the second user 340-b. For example, the invite 360 may be included in an email message, and the user device 320-b may display the email message in an email application. The second user 340-b may select to accept the invite 360, and the second user device 320-b may send an invite acceptance 370 to the group-based communication platform 305. Because the second user 340-b has a primary identity, the acceptance of the invite 360 may automatically be accepted on the primary organization 325 or workspace for the second user 340-b. For example, the second user 340-b accepting the invite 360 may correspond to the account 345-b for the second user 340-b accepting the invite 360 (e.g., if the account 345-b is within the organization 325 configured as the primary organization for the second user's email domain 330-a). The account 345-b for the second user 340-b may be added as a member of a channel 335 or a DM group 375 in response to the invite acceptance 370.

Figure 4:
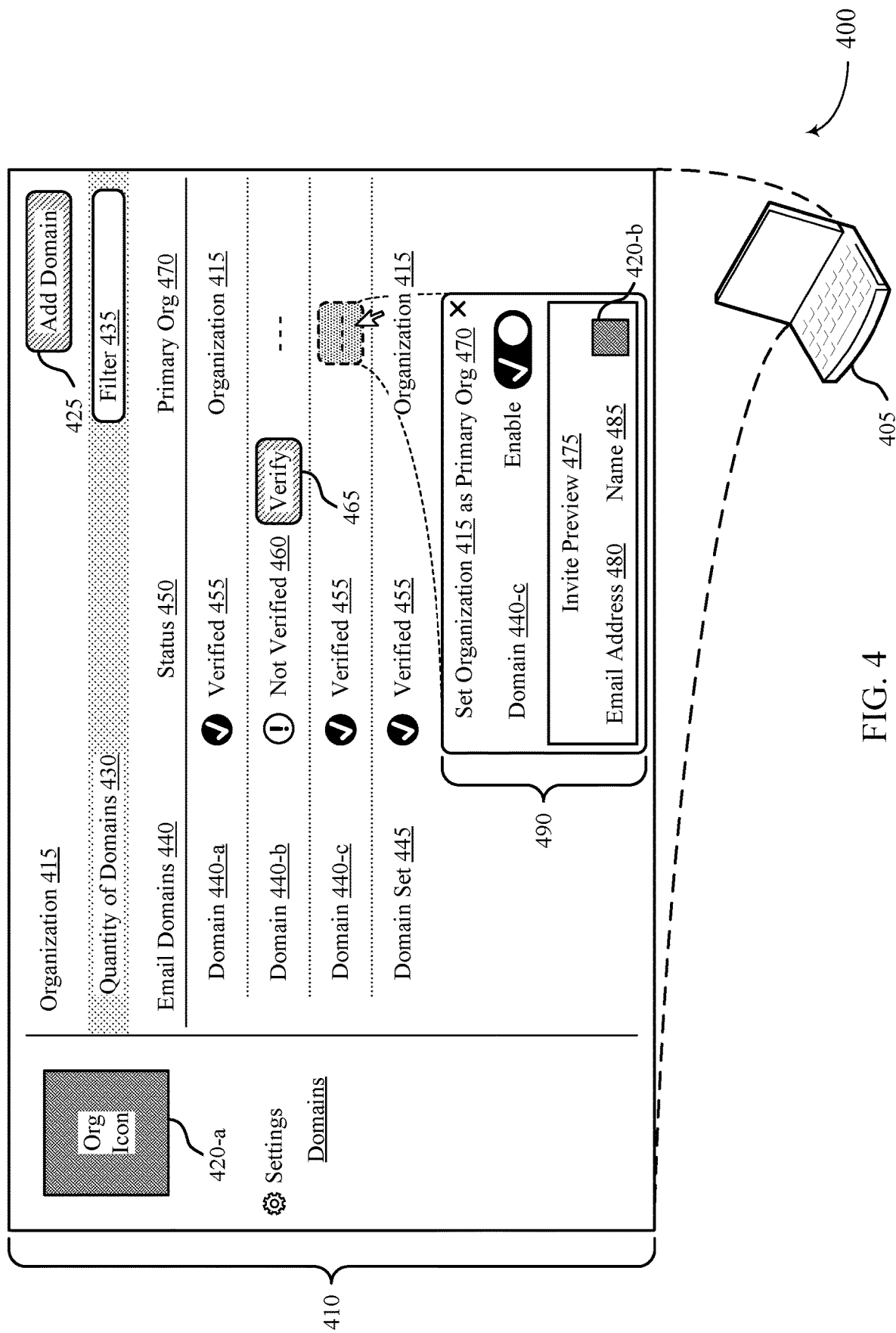
FIGS. 4 through 6B illustrate examples of user interfaces that support domain and invite management in a group-based communication system in accordance with aspects of the present disclosure.

FIG. 4 illustrates an example of a user interface 400 that supports domain and invite management in a group-based communication system in accordance with aspects of the present disclosure. A group-based communication system, such as a group-based communication system 200 or a group-based communication system 300 as described with reference to FIGS. 2 and 3, may support rendering the user interface 400 at a user device 405. The user device 405, such as a cloud client 105, a contact 110, a user device 225, a user device 320, or any combination thereof as described with reference to FIGS. 1 through 3, may display the user interface 400 to allow a user to view and edit domain 440 information for an organization 415 supported by the group-based communication system. The user interface 400 may be an example of a domain claiming and verification interface 410. The domain claiming and verification interface 410 may allow an organization 415 to claim domains 440 (e.g., email domains) as owned by the organization 415, verify that the domains 440 are owned by the organization 415, and set the organization 415 as a primary organization 470 for the domains 440. By setting the organization 415 as the primary organization 470 for a domain 440, the group-based communications system may apply organization-level settings and enforce organization-level securities to user accounts with email addresses from the domain 440.

The group-based communication system may integrate a manual domain 440 claiming process with a domain name system (DNS) infrastructure. The manual domain 440 claiming process may provide users (e.g., administrative users for an organization 415) with flexibility in indicating one or more domains 440 that are owned by an organization 415 (e.g., an organization set up and configured within the group-based communication system, a tenant in a multi-tenant database system). The DNS infrastructure may robustly verify domain 440 ownership to improve system security and to uphold user trust and confidence in the domain information stored for the group-based communication system. The domain claiming and verification interface 410 may surface the domain 440 information to a user (e.g., in a webapp client using one or more application programming interface (API) endpoints).

The domain claiming and verification interface 410 may be an example of an enterprise dashboard for an organization 415. The dashboard may be accessed via a domains tab in a settings menu. In some examples, the domains page (e.g., the domain claiming and verification interface 410) may be accessed via a "Security" section of the dashboard. The domain claiming and verification interface 410 may indicate the organization 415 and corresponding organization icon 420-a for the organization 415. In some examples, a user (e.g., an administrative user) logged into the group-based communication system may automatically be associated with a specific organization 415 (e.g., based on the user being granted administrative access for the organization 415), such that the user may access the dashboard for the organization 415 but may be restricted from accessing dashboards for other organizations 415 in the group-based communication system.

The user may view, in the dashboard, one or more domains 440 claimed by the organization 415. The user may add an additional domain 440 (e.g., claim an additional domain 440 as owned by the organization 415) using a first affordance 425 (e.g., an "Add Domain" button or another affordance). In some cases, adding a domain 440 may trigger the start of a verification process for the added domain 440. The dashboard may indicate a quantity of domains 430 currently claimed by the organization 415 and may support filtering or searching the domains 440 for the organization 415 (e.g., using a search bar 435). The dashboard may additionally display a status 450 for a claimed domain 440, a primary organization 470 for a claimed domain 440, or any combination of this information or other domain 440 information. For example, the group-based communication system may support an API (e.g., email.domains.list) to maintain a list of domains 440 for the organization 415 (e.g., domains 440 submitted for verification). The API may return the list of domain records for rendering in the domain claiming and verification interface 410. The list may include domains 440 that have not yet been verified (e.g., because the verification process may be a non-linear process that may take multiple hours or days to resolve).

The dashboard may support the verification process for a domain 440 to verify organization 415 ownership of a domain 440. Verifying that the organization 415 owns the domain 440 may support additional administrative controls for the domain 440. The verification process for the domain 440 may be triggered based on a user adding the domain 440 (e.g., using the first affordance 425), a user selecting a "Verify Domain" link or button (e.g., a second affordance 465), a user editing a primary organization 470 for the domain 440, or a user performing some other action triggering domain 440 verification.

The verification process may involve verifying that an added domain 440 is properly formatted and allowed to be claimed by an organization 415. The group-based communication system may support an API (e.g., email.domains.create) to add a domain 440 via a user input. The group-based communication system may verify, for an inputted domain 440, that the domain 440 is not included in a list of untrusted domains, is not already verified for a different organization, is not already added or verified for the organization 415, or any combination thereof. The group-based communication system may generate a challenge string—or some other verification token—for verifying the domain ownership if the domain 440 passes the initial verification step (e.g., the added domain is properly formatted and is not untrusted or already added for the organization 415 or another organization). The user device 405 may display the challenge string in the user interface 400.

The group-based communication system may support an API (e.g., email.domains.verify) to verify the domain ownership (e.g., verifying that the domain 440 is owned by the organization 415 claiming the domain 440). For example, the group-based communication system may provide instructions to a user for updating one or more DNS records for the organization 415 to verify the domain ownership. As an example, the user may be instructed to add the generated challenge string—or another verification token—to the domain DNS record. Adding the challenge string to the domain DNS record may confirm that the user has access to the DNS record for the domain 440 and—therefore—is the owner or is associated with the owner of the domain 440. The user may select the second affordance 465 once the DNS record for the domain 440 is updated with the challenge string. The API for verifying domain ownership may receive the indicated domain 440 as an input and may check to confirm that the domain has not already been verified by another organization, confirm that the challenge string generated for the domain 440 exists in the DNS record for the domain 440, or both. The group-based communication system may indicate that the domain 440 is verified as being owned by the organization 415 if the DNS record for the domain 440 includes the challenge string generated for the verification process. In some cases, a user may request an updated challenge string, and the user interface 400 may render an updated challenge string to perform verification of domain ownership using the API connected with the DNS.

The group-based communication system may support a Redux store for domain verifications, which may be referred to as the email-domains-store. The API supporting the list of domains 440 for the organization 415 (e.g., email.domains.list) may provide an array of domain records which may be stored in Redux as one or more objects keyed by the respective domain 440. To reduce the processing overhead associated with the API, the group-based communication system may call the API when the client loads the Email Domains page in the dashboard (e.g., by selecting the Domains tab under Settings). The Redux store may support changes to the list (e.g., changing a verification status 450, adding a domain 440, deleting a domain 440) using the objects keyed using the domains 440.

The group-based communication system may support single domains 440, domain sets 445, or both. For example, an organization 415 may claim a single email domain 440, such as @example.com. Additionally, or alternatively, the organization 415 may claim a domain set 445 using a wildcard character, such as @example.*. The wildcard character "*" may indicate that any sub-domains corresponding to the domain set 445 are claimed by the organization 415. For example, by claiming @example.*, the organization 415 may claim the domains @example.help.com, @example.store.com, @example.com, or any combination of these or other sub-domains. The group-based communication system may perform the verification process for each sub-domain separately or may perform a joint verification process for the domain set 445.

Additionally, or alternatively, the domain claiming and verification interface 410 may support assigning a primary organization 470 to a domain 440. For example, if a domain 440 has been added (e.g., claimed) by an organization 415 and verified as being owned by that organization 415, a user may set that organization 415 as the primary organization 470 (e.g., the primary identity) of the domain 440. The group-based communication system may support an API (e.g., email domains.setPrimary) which may be called to add a primary team identifier (ID) (e.g., a primary organization 470) associated with an email domain 440. If a primary organization 470 is set for a domain 440, the group-based communication system may apply settings, security parameters, or both configured for the primary organization 470 to users with email addresses of the domain 440. Additionally, or alternatively, the group-based communication system may automatically route invites to such users to user accounts corresponding to the primary organization 470.

As an example, the organization 415 may claim a first domain 440-a, a second domain 440-b, a third domain 440-c, and a domain set 445 (e.g., using a wildcard character to claim multiple sub-domains). A user of the organization 415 (e.g., an administrative user) may verify one or more of the domains 440. The verification status (e.g., the status 450) for each domain 440 may be displayed in the domain claiming and verification interface 410. For example, the domain 440-a may be verified 455, the domain 440-b may not be verified 460 (e.g., but may support an affordance 465 to trigger verification for the domain 440-b), the domain 440-c may be verified 455, and the domain set 445 may be verified 455. Additionally, or alternatively, the primary organization 470 for each domain 440 may be displayed in the domain claiming and verification interface 410. For example, the domain 440-a may have the organization 415 set as the primary organization 470 and the domain set 445 may have the organization 415 set as the primary organization 470. The primary organization 470 for the domain 440-b and the domain 440-c may currently be unassigned.

To assign the primary organization 470 for the domain 440-c, a user may select an affordance, which may trigger rendering of a window 490 for primary organization 470 selection. For example, the user may select an affordance in the window 490 to toggle enablement of the primary organization 470. The user may select to enable the organization 415 verified for the domain 440-c as the primary organization 470 for the domain 440-c. The window 490 may additionally include an invite preview 475, which may include information relating to how information may be displayed in a user invite (e.g., for a channel of the group-based communication system, for a direct message in the group-based communication system). For example, the invite preview 475 may display an email address 480 (e.g., an example email address associated with the domain 440-c), a name 485 associated with the organization 415 set as the primary organization 470 for the domain 440-c, an organization icon 420-b corresponding to the organization 415 set as the primary organization 470 for the domain 440-c, or some combination thereof. The name 485 and the organization icon 420-b may help a user sending or receiving an invite to easily and accurately identify that the sender of the invite, the recipient of the invite, or both are using accounts associated with the primary organization 470 and—correspondingly—following settings and security parameters configured for the primary organization 470. Accordingly, the group-based communication system may improve security for invites associated with an organization 415.

Figure 5:
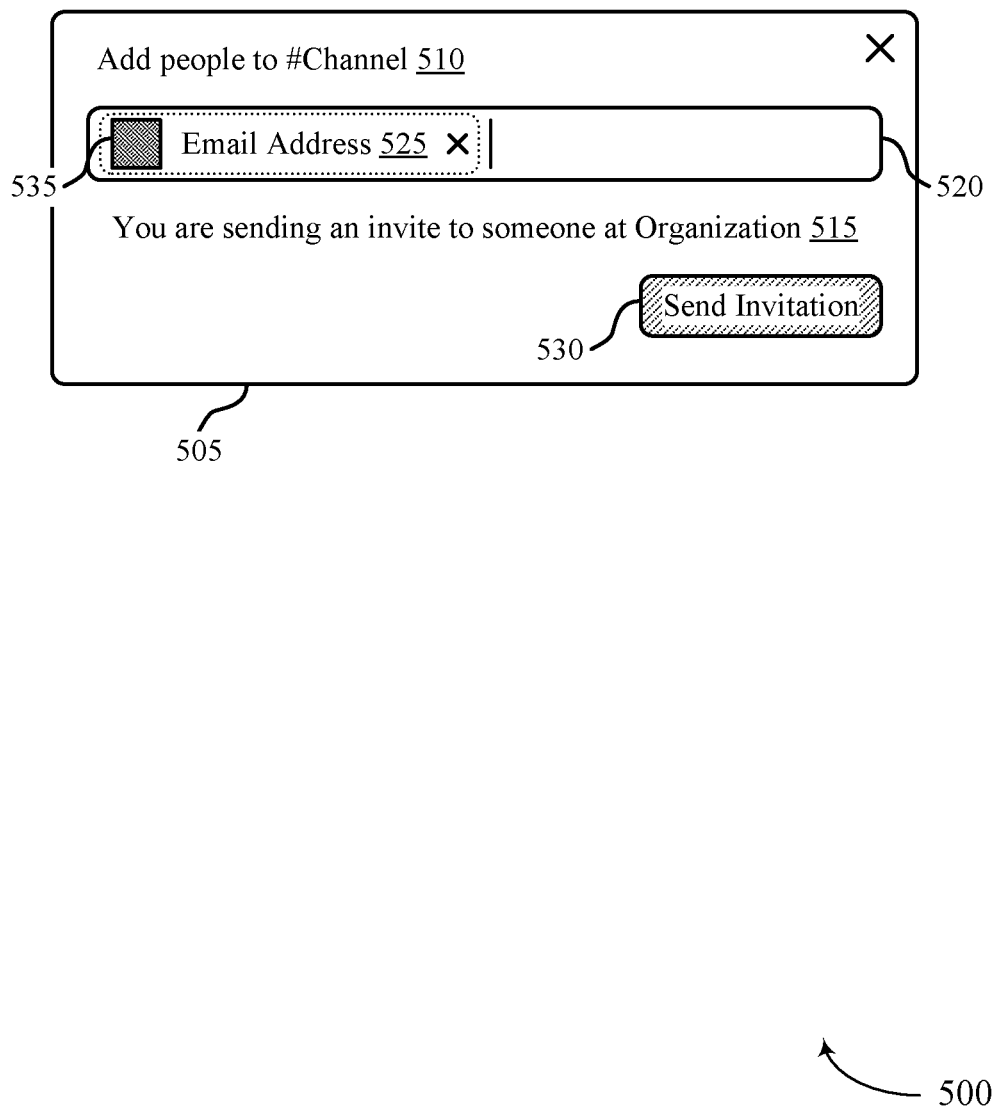

FIG. 5 illustrates an example of a user interface 500 that supports domain and invite management in a group-based communication system in accordance with aspects of the present disclosure. A group-based communication system, such as a group-based communication system 200 or a group-based communication system 300 as described with reference to FIGS. 2 and 3, may support rendering the user interface 500 at a user device, such as a cloud client 105, a contact 110, a user device 225, a user device 320, a user device 405, or any combination thereof as described with reference to FIGS. 1 through 4. The user interface 500 may display a window 505 supporting preparing and sending a channel invite for a channel 510 of the group-based communication system. The user interface 500 may display, for the channel invite, information (e.g., icons, identifiers) indicating whether the channel invite is being sent to one or more accounts associated with a primary organization.

The group-based communication system may support organization visibility for channel invites. For example, the window 505 may display the name and an icon 535 (e.g., a unique icon) of the organization 515 set as the primary organization for the intended recipient's domain. The user creating the invite may add a user as a recipient of the invite using the input field 520. The user may input the recipient's email address 525 into the input field 520. Based on the email domain of the email address 525 (e.g., at the time of email selection in the input field 520), the group-based communication system may determine if the recipient is associated with a specific primary organization (e.g., a primary organization configured for the email domain as described herein with reference to FIG. 4) by making an API call for primary identity information. The user creating the invite may visually confirm that the input email address 525 corresponds to the correct user and user account based on the information displayed in the window 505, giving the inviter more confidence in the accuracy of the invite. For example, if the icon 535 matches an expected icon and the name of the organization 515 matches an expected name for the organization owning—or otherwise associated with—the channel 510, the user creating the invite may confirm that the recipient account is part of the correct organization 515 and follows protocols set by the organization 515.

The group-based communication system may additionally, or alternatively, support invite flow routing to ensure the invite is routed to a correct account for a user (e.g., a recipient indicated by an email address 525). In some examples, the invite may be sent to multiple recipients (e.g., if multiple email addresses 525 are added to the input field 520). For example, the user creating the invite may select an affordance 530 to send the invite to the indicated recipients. In response to the selection of the affordance, the group-based communication system may automatically route the invite to a specific account for a user indicated as a recipient. For example, if the user (e.g., the user's email address 525) is associated with multiple accounts in the group-based communication system, the invite may be automatically configured to be sent to an account of the multiple accounts corresponding to the primary organization set for the domain of the user's email address 525. For example, rather than provide the recipient user the flexibility to accept the invite using any account for the recipient, the group-based communication system may automatically link the invite to a specific account and may restrict the user from accepting the invite from another account different from the specific account. The routing of the invite to the specific account associated with the primary organization from multiple user accounts may improve security associated with inviting users to a channel 510 and may give administrative users more confidence that the accounts invited and added to the channel 510 are following protocols configured for the channel 510 (e.g., based on the channel 510 being associated with the same primary organization).

Although described herein with reference to a channel invite, the group-based communication system may similarly support DM invites, calendar invites, or both using similar features. For example, a user may invite one or more other users to join a DM group or DM channel using an invite that displays information indicating a recipient's primary organization and automatically routes the invite to a user account for the recipient corresponding to the primary organization. Accordingly, the group-based communication system may similarly support improved security associated with inviting users to a DM group or channel, a meeting hosted in the group-based communication system, or any combination thereof The window 505—or a similar display—may be used in a user interface 500 when invite creation is triggered (e.g., regardless of how the invite creation is triggered for a consistent user experience). For example, the group-based communication system may support accessing the user interface 500 from various entry points, such as if a user creates a channel invite from an "Add People" modal, an invite from a Hub application, an invite from a Composer application, an invite from a message pane, or any other entry point. In some examples, creating the invite may trigger sending an email invite to the indicated email addresses 525. Additionally, or alternatively, the recipients of the invite may access the invite within a group-based communication interface for the group-based communication system (e.g., separate from an email application).

As an example, a user may add the email address 525 to the invite. In response to adding the email address 525, a handler (e.g., emails.info handler) may call into an email classification engine to determine whether the email address 525 is classified as an "internal" or "external" email. An internal email may correspond to a same domain as the user sending the invite, while an external email may correspond to a different domain. In some cases, the email classification engine may classify the added email address 525 as external if the added email address 525 corresponds to a domain from a list of untrusted domains, a domain from a social network, or both. Additionally, or alternatively, the email classification engine may classify the added email address 525 as internal if the added email address 525 corresponds to a domain that matches the domain for the user creating the invite or corresponds to the same primary organization as the user creating the invite, the channel 510 associated with the invite, or both.

For an email address 525 classified as external, the group-based communication system may determine the primary organization for the domain associated with the email address 525. The group-based communication system may return a team ID, a team name (e.g., the organization 515), a team icon (e.g., an icon 535), or any combination of these or other team-based identifier for the primary organization and may render the team-based identifiers for display in the window 505 for the external email. In some examples, the window 505 may display different icons 535 corresponding to different primary organizations 515 with different email addresses 525 added to the invite. In this way, the user creating the invite may visually identify which email addresses 525 correspond to users with accounts associated with the primary organization 515 for the channel 510, improving invite security.

In some examples, the group-based communication system may maintain previously created connections for users. For example, a user may be added to a channel 510 or an organization 515 prior to configuring a primary identity for the user. Rather than remove the user from the channel 510 or the organization 515, the system may maintain the user as a member of the channel 510 or the organization 515 (e.g., even if a new or modified primary identity for the user fails to correspond to a trusted organization for the channel 510 or organization 515).

Figure 6B:
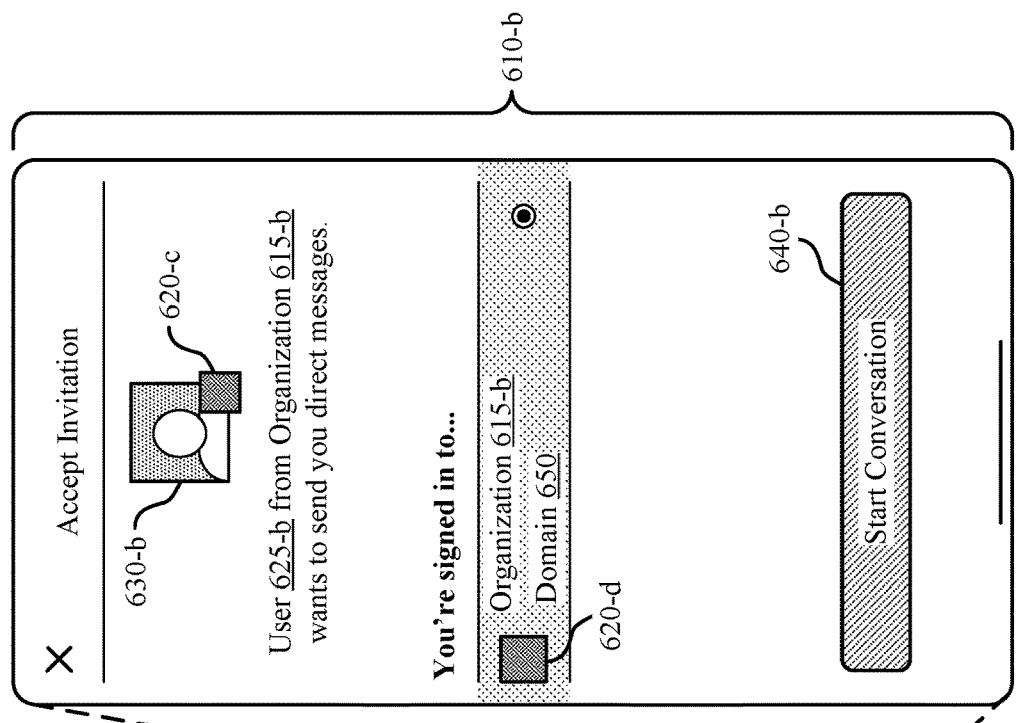
Figure 6A:
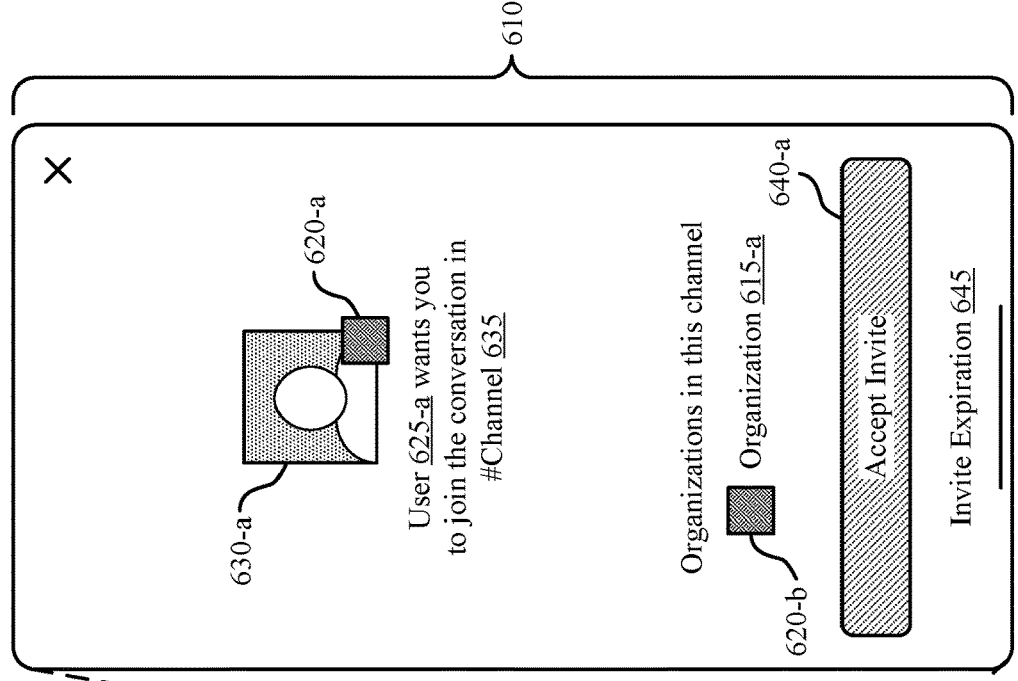

FIGS. 6A and 6B illustrate examples of user interfaces 600 that support domain and invite management in a group-based communication system in accordance with aspects of the present disclosure. For example, FIG. 6A illustrates an example of a user interface 600-*a* that supports channel invite reception and acceptance. A group-based communication system, such as a group-based communication system 200 or a group-based communication system 300 as described with reference to FIGS. 2 and 3, may support rendering the user interface 600-*a* at a user device 605-*a*, such as a cloud client 105, a contact 110, a user device 225, a user device 320, a user device 405, or any combination thereof as described with reference to FIGS. 1 through 4. The user interface 600-*a* may display a received invite 610-*a* inviting a user operating the user device 605-*a* to a channel 635. The user interface 600-*a* may route the invite 610-*a* to a specific account of the user operating the user device 605-*a* to improve the security of adding the user to the channel 635.

For example, the user interface 600-*a* may refrain from providing the user with options for selecting an account with which to accept the invite 610-*a*. Instead, the invite 610-*a* may automatically be associated with an account corresponding to the primary identity of the user receiving the invite 610-*a*. The user interface 600-*a* may additionally display information to help the user operating the user device 605-*a* determine the source of the invite 610-*a*. For example, the user interface 600-*a* may indicate the user 625-*a* who sent the invite 610-*a*. In some cases, the user interface 600-*a* may display a profile picture 630-*a* of the user 625-*a* and an organization icon 620-*a* for the organization 615-*a* to which the user 625-*a* belongs. The user receiving the invite 610-*a* may use this information to determine if the user 625-*a* sending the invite 610-*a* (or, similarly, the organization 615-*a* associated with the invite 610-*a*) can be trusted.

Additionally, or alternatively, the user interface 600-*a* may display an indication of the channel 635 associated with the invite 610-*a*. For example, the invite 610-*a* may invite the user operating the user device 605-*a* to join a channel 635 in the group-based communication system. The channel 635 may additionally be associated with an organization 615-*a* (e.g., the organization 615-*a* that created the channel 635). The user interface 600-*a* may display an organization icon 620-*b* for the organization 615-*a* to which the channel 635 belongs. The user receiving the invite 610-*a* may use this information to determine if the channel 635 (or, similarly, the organization 615-*a* associated with the channel 635) can be trusted.

If the user operating the user device 605-*a* selects an affordance 640-*a* (e.g., a button or link) to accept the invite 610-*a*, the user may be added as a member of the channel 635. Specifically, the system may route the invite 610-*a* such that the user's account associated with the organization 615-*a* may be added as a member of the channel 635. The user interface 600-*a* may prevent the user from selecting a different account with which to accept the invite 610-*a*. In some cases, the invite 610-*a* may be associated with an invite expiration time 645, after which the system may block the user from accepting the invite 610-*a*.

FIG. 6B illustrates an example of a user interface 600-*b* that supports DM invite reception and acceptance. A group-based communication system, such as a group-based communication system 200 or a group-based communication system 300 as described with reference to FIGS. 2 and 3, may support rendering the user interface 600-*b* at a user device 605-*b*, such as a cloud client 105, a contact 110, a user device 225, a user device 320, a user device 405, or any combination thereof as described with reference to FIGS. 1 through 4. The user interface 600-*b* may display a received invite 610-*b* inviting a user to a DM group. The user interface 600-*b* may route the invite 610-*b* to a specific account of the user operating the user device 605-*b* to improve the security of adding the user to the DM group.

The user interface 600-*b* may additionally display information to help the user operating the user device 605-*b* determine the source of the invite 610-*b*. For example, the user interface 600-*b* may indicate the user 625-*b* who sent the invite 610-*b*. In some cases, the user interface 600-*b* may display a profile picture 630-*b* of the user 625-*b* and an organization icon 620-*c* for the organization 615-*b* to which the user 625-*b* belongs. The user receiving the invite 610-*b* may use this information to determine if the user 625-*b* sending the invite 610-*b* (or, similarly, the organization 615-*b* associated with the invite 610-*b*) can be trusted.

In some examples, the user interface 600-*b* may additionally indicate the account with which the user operating the user device 605-*b* is signed in to the group-based communication system. For example, the user operating the user device 605-*b* may be logged in with an account corresponding to the organization 615-*b*, which is the primary organization for the domain 650 of the user's email address. In some cases, if the user operating the user device 605-*b* is not currently logged into this account (e.g., is not logged in or is logged in with a different account), the system may trigger a login procedure for the user such that the user may log into the account associated with the primary organization for the domain 650 of the user's email address. As such, the user may view the invite 610-*b* once the user is logged in with the account associated with the primary organization (e.g., the organization 615-*b* corresponding to the organization icon 620-*d*) for the domain 650 of the user's email address. If the user selects an affordance 640-*b* to start the conversation (e.g., to join the DM group corresponding to the invite 610-*b*), the group-based communication system may add the user operating the user device 605-*b* to the DM group.

Specifically, the user's logged in account corresponding to the organization 615-*b* may be added to the DM group. By requesting that the user log into the account associated with the primary organization (e.g., the organization 615-*b*) for the domain 650 in order to view the invite 610-*b*, the system may inherently guide (e.g., route) the invite 610-*b* to the user's primary identity to improve security associated with adding the user to the DM group. For example, the system may ensure that the invite 610-*b* is accepted on the organization 615-*b* that has claimed the domain 650 of the email address to which the invite 610-*b* was sent (e.g., the email address of the user operating the user device 605-*b*).

Figure 7:
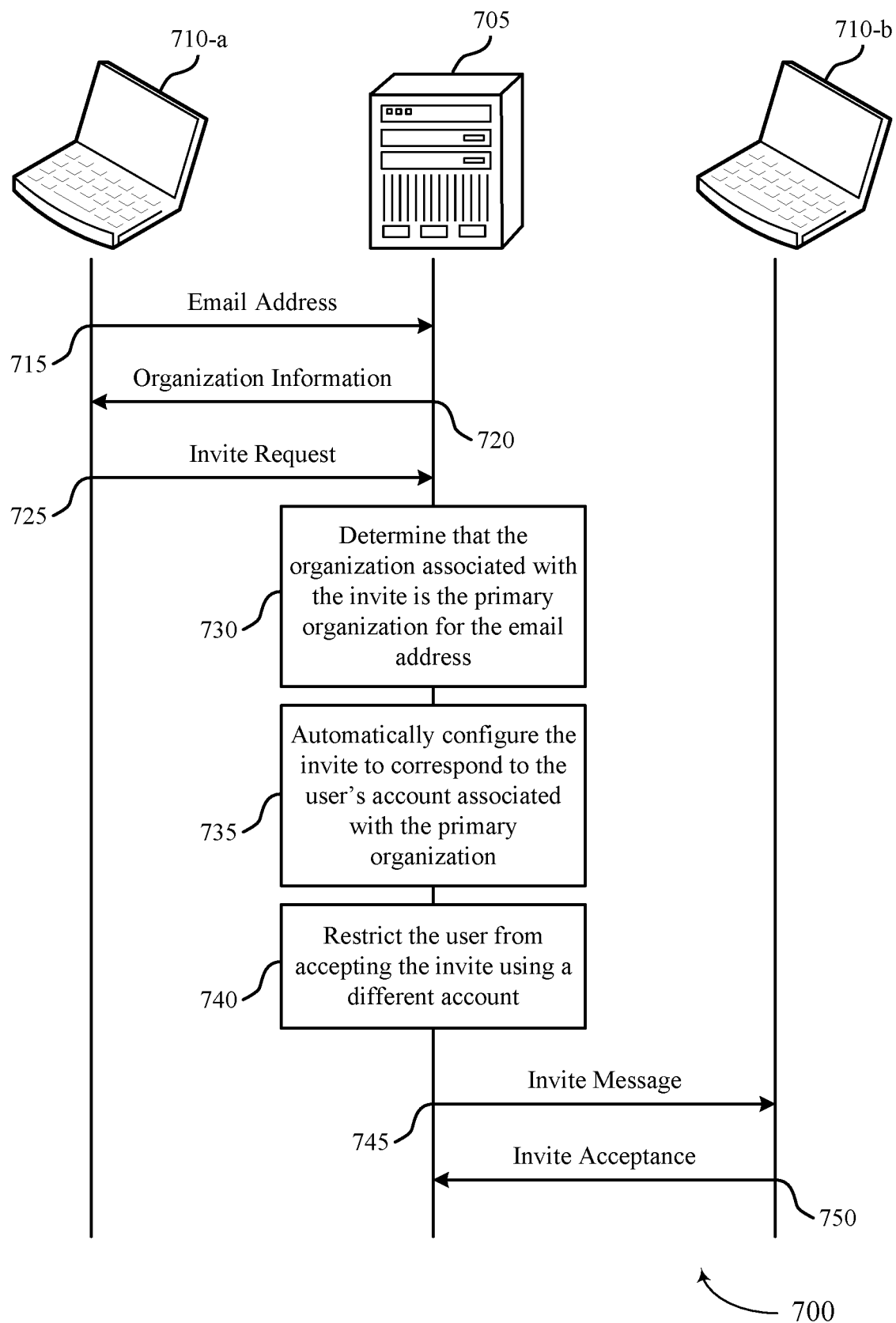
FIG. 7 illustrates an example of a process flow that supports domain and invite management in a group-based communication system in accordance with aspects of the present disclosure.

FIG. 7 illustrates an example of a process flow 700 that supports domain and invite management in a group-based communication system in accordance with aspects of the present disclosure. The process flow 700 may be implemented by a group-based communication system including one or more computing devices 705 and one or more user devices. The computing device 705 may host a group-based communication platform. The user device 710-*a* and the user device 710-*b* may access the group-based communication platform over a network, based on downloading an application, or both. The user device 710-*a* and the user device 710-*b* may include user interfaces that can display information corresponding to the group-based communication platform, as described herein with reference to FIGS. 1 through 6B. Alternative examples of the following may be implemented, where some processes are performed in a different order than described or are not performed at all. In some examples, processes may include additional features not mentioned below, or further processes may be added.

At 715, a first user operating the user device 710-*a* may input an email address (e.g., an email address corresponding to a second user) as a recipient for an invite at the user device 710-*a*. The user device 710-*a* may send, to the computing device 705, an indication of the email address for the second user.

The computing device 705 may determine an organization set as the primary organization for the domain of the second user's email address. At 720, in response to the indication of the email address for the second user, the computing device 705 may send, for rendering at the user device 710-*a*, organization information for the primary organization for the second user's email domain. This primary organization may correspond to the primary identity of the second user. The first user may review the organization information displayed (or otherwise presented, for example, audibly) at the user device 710-*a* to determine whether the input email address corresponds to a trusted organization (or at least the organization intended by the first user).

At 725, the first user may select to send the invite. The computing device 705 may receive, from the first user device 710-*a* associated with the first user, a request to invite the second user, for example, to a group-based communication channel. The channel may be associated with an organization in the group-based communication system. The request may indicate the email address for the second user. In some examples, the second user may correspond to multiple accounts in the group-based communication system, where the multiple accounts are linked to the same email address—or multiple email aliases—of the second user.

At 730, the computing device 705 may determine that the organization is set as the primary organization for the email domain of the second user's email address in the group-based communications system. Additionally, or alternatively, the computing device 705 may determine that the primary organization for the second user is a trusted organization permitting the first user to invite the second user to the group-based communication channel.

At 735, the computing device 705 may automatically configure a channel invite for the second user to correspond to a first account of the multiple accounts for the second user. For example, the first account may be associated with the organization that is set as the primary organization for the second user's email domain. The computing device 705 may associate the channel invite with the first account to restrict the second user from accepting the channel invite using a different account. For example, at 740, the computing device 705 may restrict a second account of the multiple accounts for the second user from accepting the channel invite based on the second account being unassociated with the organization that is set as the primary organization for the second user's email domain.

At 745, the computing device 705 may send an invite message to the second user device 710-*b* in response to the invite request. The second user device 710-*b* may receive the invite message and may render the invite message in a user interface. In some examples, the invite message may be an example of a message including the channel invite for the second user to join the group-based communication channel, where the channel invite is automatically configured to correspond to the first account (e.g., the first account corresponding to the primary identity of the second user).

At 750, the second user may accept the channel invite using the second user device 710-*b*. The computing device 705 may receive, in response to the invite message, an acceptance of the channel invite. The computing device 705 may add the first account of the second user as a member of the group-based communication channel based on the acceptance of the channel invite and the channel invite being automatically configured to correspond to the first account.

The computing device 705 may apply, to the first account for the second user, one or more settings, one or more policies, one or more security parameters, one or more compliance parameters, or a combination thereof corresponding to the organization based on the first account being associated with the organization. Accordingly, the first account added to the group-based communication channel may follow a configuration for the primary organization, enforcing security of the channel based on the configuration for the primary organization.

In some examples, the first user may be part of the same organization as the second user (e.g., the primary organization). In some other examples, the first user may be part of a different organization than the second user (e.g., the first user and the second user may correspond to different primary organizations).

Figure 8:
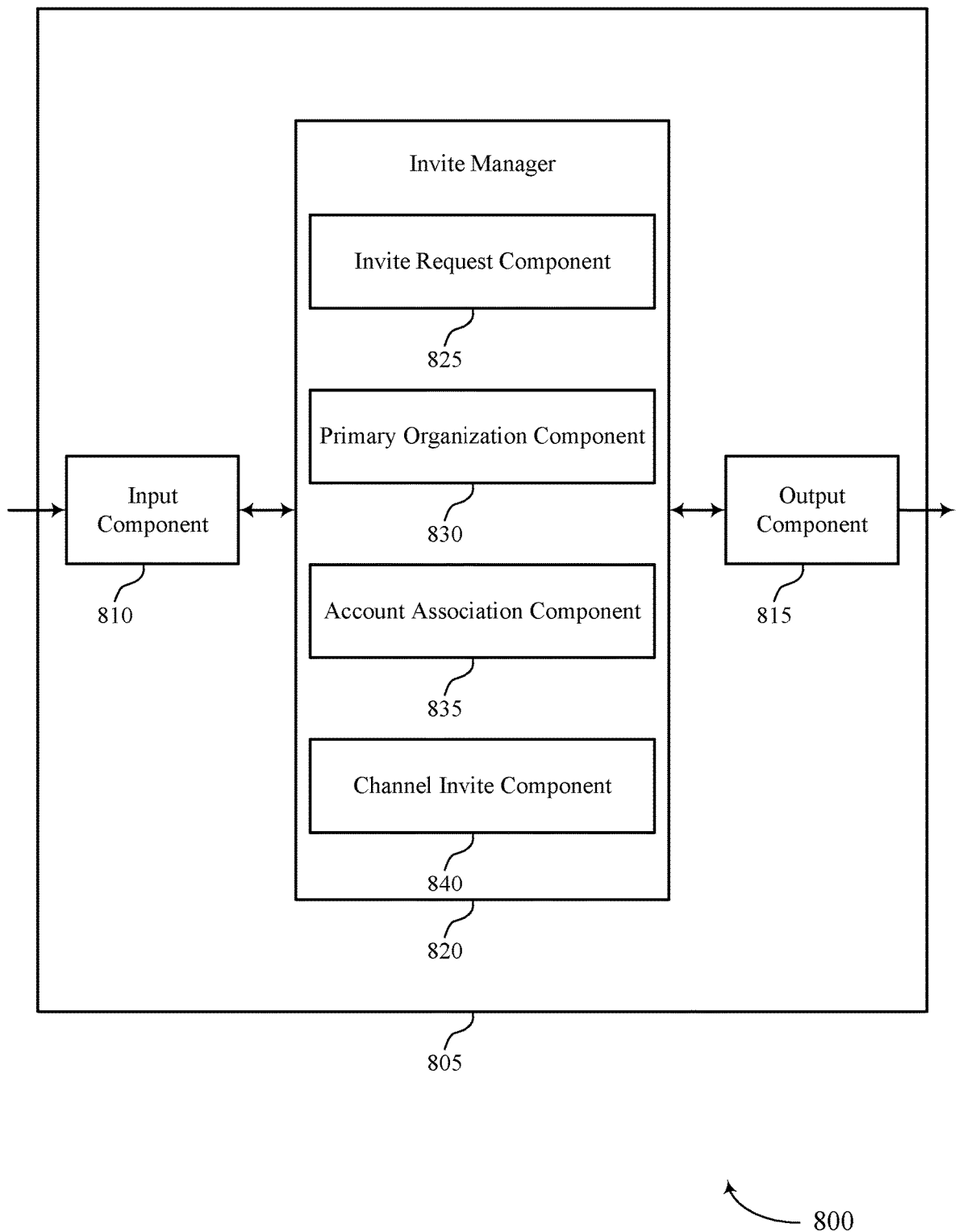
FIG. 8 shows a block diagram of an apparatus that supports domain and invite management in a group-based communication system in accordance with aspects of the present disclosure.

FIG. 8 shows a block diagram 800 of a device 805 that supports domain and invite management in a group-based communication system in accordance with aspects of the present disclosure. The device 805 may include an input component 810, an output component 815, and an invite manager 820. The device 805 may also include a processor. Each of these components may be in communication with one another (e.g., via one or more buses).

The input component 810 may manage input signals for the device 805. For example, the input component 810 may identify input signals based on an interaction with a modem, a keyboard, a mouse, a touchscreen, or a similar device. These input signals may be associated with user input or processing at other components or devices. In some cases, the input component 810 may utilize an operating system such as iOS®, ANDROID®, MS-DOS®, MS-WIN- DOWS®, OS/2®, UNIX®, LINUX®, or another known operating system to handle input signals. The input component 810 may send aspects of these input signals to other components of the device 805 for processing. For example, the input component 810 may transmit input signals to the invite manager 820 to support domain and invite management in a group-based communication system. In some cases, the input component 810 may be a component of an input/output (I/O) controller 1010 as described with reference to FIG. 10.

The output component 815 may manage output signals for the device 805. For example, the output component 815 may receive signals from other components of the device 805, such as the invite manager 820, and may transmit these signals to other components or devices. In some examples, the output component 815 may transmit output signals for display in a user interface, for storage in a database or data store, for further processing at a server or server cluster, or for any other processes at any number of devices or systems. In some cases, the output component 815 may be a component of an I/O controller 1010 as described with reference to FIG. 10.

For example, the invite manager 820 may include an invite request component 825, a primary organization component 830, an account association component 835, a channel invite component 840, or any combination thereof. In some examples, the invite manager 820, or various components thereof, may be configured to perform various operations (e.g., receiving, monitoring, transmitting) using or otherwise in cooperation with the input component 810, the output component 815, or both. For example, the invite manager 820 may receive information from the input component 810, send information to the output component 815, or be integrated in combination with the input component 810, the output component 815, or both to receive information, transmit information, or perform various other operations as described herein.

The invite manager 820 may support domain management for a group-based communication system in accordance with examples as disclosed herein. The invite request component 825 may be configured as or otherwise support a means for receiving, from a first user device associated with a first user, a request to invite a second user to a group-based communication channel associated with an organization in the group-based communication system. The request may indicate an email address for the second user, and the second user may correspond to a set of multiple accounts in the group-based communication system. The primary organization component 830 may be configured as or otherwise support a means for determining that the organization is set as a primary organization for a domain of the email address in the group-based communication system. The account association component 835 may be configured as or otherwise support a means for automatically configuring a channel invite for the second user to correspond to a first account of the set of multiple accounts based on the first account being associated with the organization and the organization being set as the primary organization for the domain. The channel invite component 840 may be configured as or otherwise support a means for, in response to the request, sending, for rendering at a second user device associated with the second user, a message including the channel invite for the second user to join the group-based communication channel, where the channel invite is automatically configured to correspond to the first account.

Figure 9:
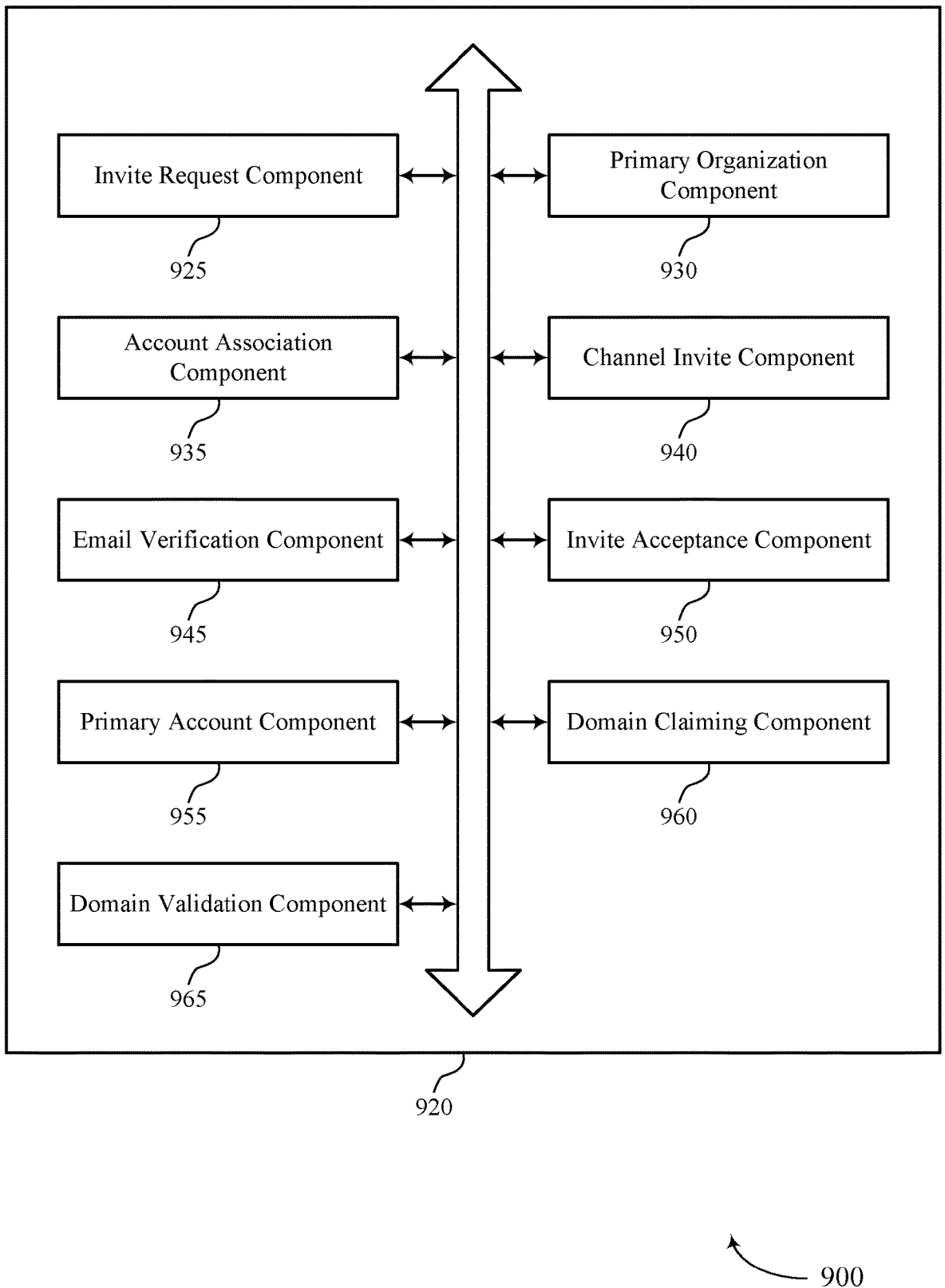
FIG. 9 shows a block diagram of an invite manager that supports domain and invite management in a group-based communication system in accordance with aspects of the present disclosure.

FIG. 9 shows a block diagram 900 of an invite manager 920 that supports domain and invite management in a group-based communication system in accordance with aspects of the present disclosure. The invite manager 920 may be an example of aspects of an invite manager 820 as described herein. The invite manager 920, or various components thereof, may be an example of means for performing various aspects of domain and invite management in a group-based communication system as described herein. For example, the invite manager 920 may include an invite request component 925, a primary organization component 930, an account association component 935, a channel invite component 940, an email verification component 945, an invite acceptance component 950, a primary account component 955, a domain claiming component 960, a domain validation component 965, or any combination thereof. Each of these components may communicate, directly or indirectly, with one another (e.g., via one or more buses).

The invite manager 920 may support domain management for a group-based communication system in accordance with examples as disclosed herein. The invite request component 925 may be configured as or otherwise support a means for receiving, from a first user device associated with a first user, a request to invite a second user to a group-based communication channel associated with an organization in the group-based communication system. The request may indicate an email address for the second user, and the second user may correspond to a set of multiple accounts in the group-based communication system. The primary organization component 930 may be configured as or otherwise support a means for determining that the organization is set as a primary organization for a domain of the email address in the group-based communication system. The account association component 935 may be configured as or otherwise support a means for automatically configuring a channel invite for the second user to correspond to a first account of the set of multiple accounts based on the first account being associated with the organization and the organization being set as the primary organization for the domain. In response to the request, the channel invite component 940 may be configured as or otherwise support a means for sending, for rendering at a second user device associated with the second user, a message including the channel invite for the second user to join the group-based communication channel, the channel invite automatically configured to correspond to the first account.

In some examples, the email verification component 945 may be configured as or otherwise support a means for receiving, from the first user device, an indication of the email address for the second user. In some examples, in response to the indication of the email address for the second user, the email verification component 945 may be configured as or otherwise support a means for sending, for rendering at the first user device, an icon indicating the organization that is set as the primary organization for the domain of the email address.

In some examples, in response to the message including the channel invite, the invite acceptance component 950 may be configured as or otherwise support a means for receiving, from the second user device, an acceptance of the channel invite. In some examples, the account association component 935 may be configured as or otherwise support a means for adding the first account for the second user as a member of the group-based communication channel based on the acceptance of the channel invite and the channel invite being automatically configured to correspond to the first account.

In some examples, the account association component 935 may be configured as or otherwise support a means for applying, to the first account for the second user, one or more settings, one or more policies, one or more security parameters, one or more compliance parameters, or a combination thereof corresponding to the organization based on the first account being associated with the organization.

In some examples, the primary account component 955 may be configured as or otherwise support a means for assigning the first account as a primary account for the second user in the group-based communication system based on the first account being associated with the organization that is set as the primary organization for the domain of the email address for the second user.

In some examples, the domain claiming component 960 may be configured as or otherwise support a means for storing, for the organization, one or more domains claimed by the organization. In some examples, the domain validation component 965 may be configured as or otherwise support a means for validating that the organization owns the one or more domains claimed by the organization, where the one or more domains includes the domain of the email address for the second user.

In some examples, to support validating a domain, the domain validation component 965 may be configured as or otherwise support a means for generating a string value for validating the domain. In some examples, the domain validation component 965 may be configured as or otherwise support a means for sending, to a third user device associated with a third user of the organization, the generated string value. In some examples, the domain validation component 965 may be configured as or otherwise support a means for determining that the organization owns the domain based on a DNS record for the domain including the generated string value sent to the third user device.

In some examples, to support storing the one or more domains claimed by the organization, the domain claiming component 960 may be configured as or otherwise support a means for storing, for the organization, a set of multiple sub-domains claimed by the organization based on a partial domain name and a wildcard character.

In some examples, the primary organization component 930 may be configured as or otherwise support a means for receiving, from a third user device associated with a third user of the organization, a user input selecting the organization as the primary organization for the domain of the email address in the group-based communication system.

In some examples, the account association component 935 may be configured as or otherwise support a means for restricting a second account of the set of multiple accounts from accepting the channel invite based on the second account being unassociated with the organization that is set as the primary organization for the domain of the email address.

Figure 10:
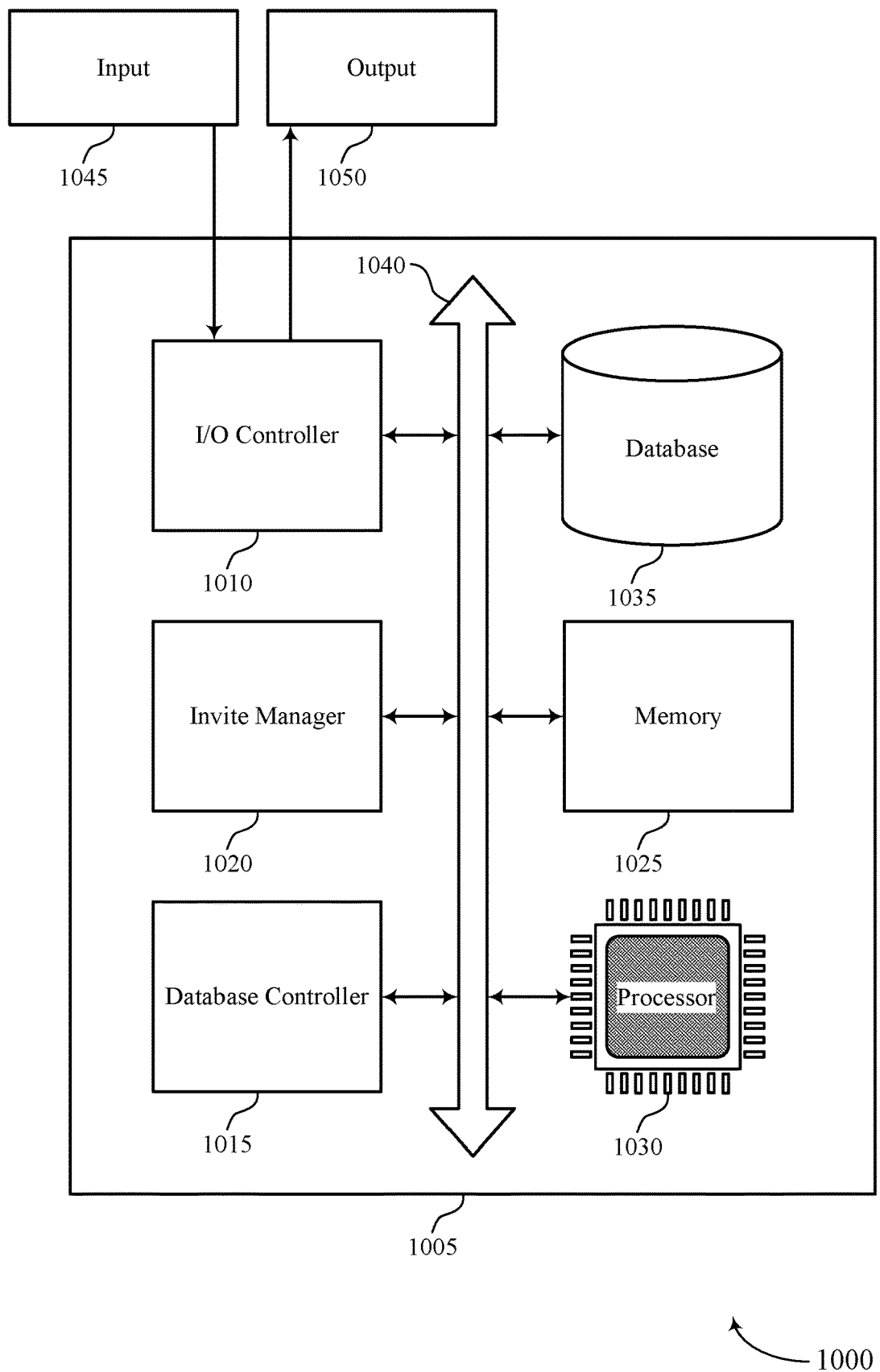
FIG. 10 shows a diagram of a system including a device that supports domain and invite management in a group-based communication system in accordance with aspects of the present disclosure.

FIG. 10 shows a diagram of a system 1000 including a device 1005 that supports domain and invite management in a group-based communication system in accordance with aspects of the present disclosure. The device 1005 may be an example of or include the components of a device 805 as described herein. The device 1005 may include components for bi-directional data communications including components for transmitting and receiving communications, such as an invite manager 1020, an I/O controller 1010, a database controller 1015, a memory 1025, a processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor 1030. In some examples, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor 1030 to perform various functions described herein. In some cases, the memory 1025 may contain, among other things, a basic I/O system (BIOS) which may control basic hardware or software operation such as the interaction with peripheral components or devices.

The processor 1030 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1030 may be configured to operate a memory array using a memory controller. In some other cases, a memory controller may be integrated into the processor 1030. The processor 1030 may be configured to execute computer-readable instructions stored in a memory 1025 to perform various functions (e.g., functions or tasks supporting domain and invite management in a group-based communication system).

The invite manager 1020 may support domain management for a group-based communication system in accordance with examples as disclosed herein. For example, the invite manager 1020 may be configured as or otherwise support a means for receiving, from a first user device associated with a first user, a request to invite a second user to a group-based communication channel associated with an organization in the group-based communication system. The request may indicate an email address for the second user, and the second user may correspond to a set of multiple accounts in the group-based communication system. The invite manager 1020 may be configured as or otherwise support a means for determining that the organization is set as a primary organization for a domain of the email address in the group-based communication system. The invite manager 1020 may be configured as or otherwise support a means for automatically configuring a channel invite for the second user to correspond to a first account of the set of multiple accounts based on the first account being associated with the organization and the organization being set as the primary organization for the domain. The invite manager 1020 may be configured as or otherwise support a means for—in response to the request—sending, for rendering at a second user device associated with the second user, a message including the channel invite for the second user to join the group-based communication channel, the channel invite automatically configured to correspond to the first account.

Figure 11:
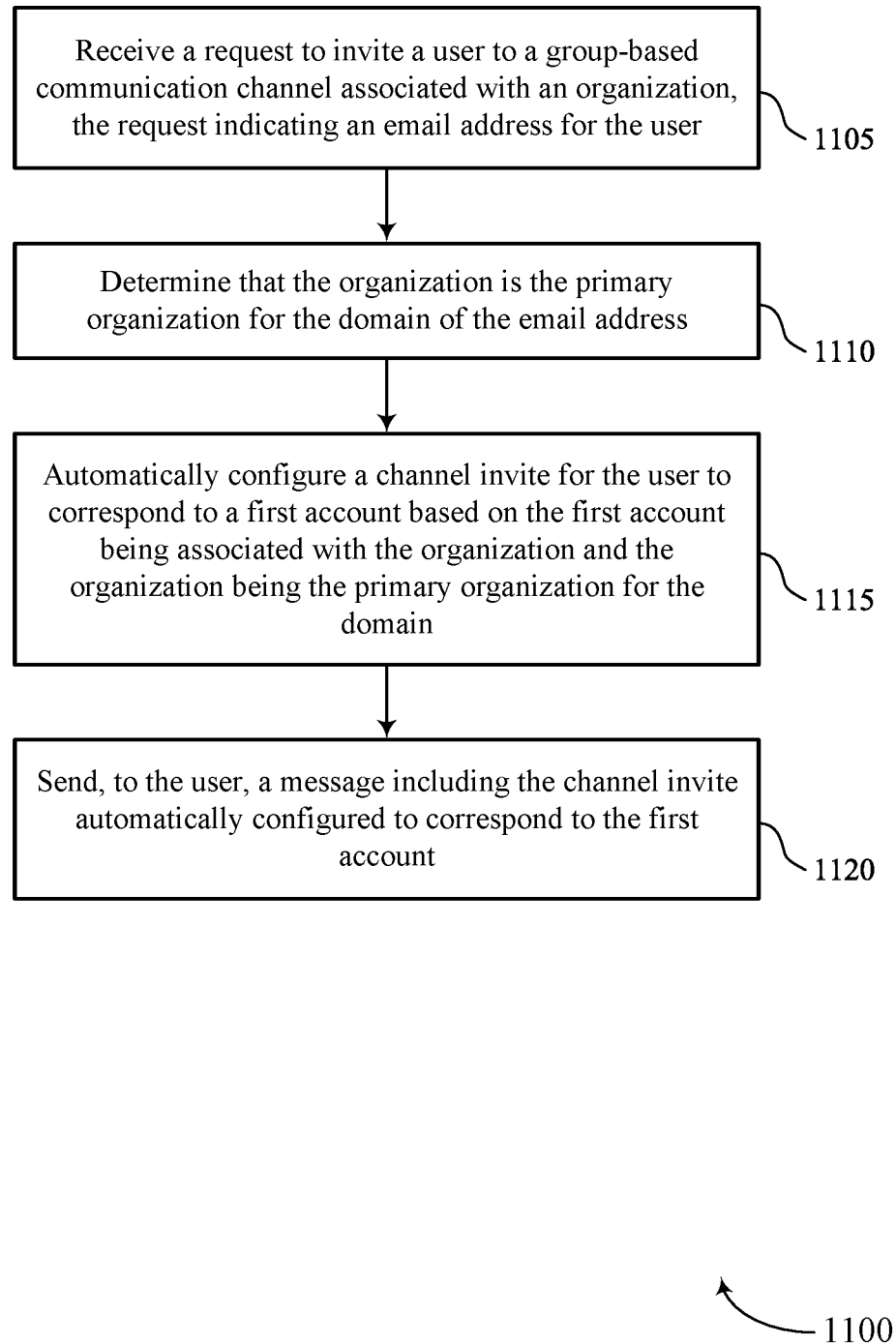
FIGS. 11 and 12 show flowcharts illustrating methods that support domain and invite management in a group-based communication system in accordance with aspects of the present disclosure.

FIG. 11 shows a flowchart illustrating a method 1100 that supports domain and invite management in a group-based communication system in accordance with aspects of the present disclosure. The operations of the method 1100 may be implemented by a group-based communication platform or its components (e.g., a computing device, such as an application server, a database server, a cloud-based server or service, a worker server, a server cluster, a virtual machine, a container, or any combination of these or other computing devices) as described herein. For example, the operations of the method 1100 may be performed by a group-based communication platform as described with reference to FIGS. 1 through 10. In some examples, a group-based communication platform may execute a set of instructions to control the functional elements of the group-based communication platform to perform the described functions. Additionally, or alternatively, the group-based communication platform may perform aspects of the described functions using special-purpose hardware.

At 1105, the method may include receiving, from a first user device associated with a first user, a request to invite a second user to a group-based communication channel associated with an organization in the group-based communication system. The request may indicate an email address for the second user, and the second user may correspond to a set of multiple accounts in the group-based communication system. The operations of 1105 may be performed in accordance with examples as disclosed herein. In some examples, aspects of the operations of 1105 may be performed by an invite request component 925 as described with reference to FIG. 9.

At 1110, the method may include determining that the organization is set as a primary organization for a domain of the email address in the group-based communication system. The operations of 1110 may be performed in accordance with examples as disclosed herein. In some examples, aspects of the operations of 1110 may be performed by a primary organization component 930 as described with reference to FIG. 9.

At 1115, the method may include automatically configuring a channel invite for the second user to correspond to a first account of the set of multiple accounts based on the first account being associated with the organization and the organization being set as the primary organization for the domain. The operations of 1115 may be performed in accordance with examples as disclosed herein. In some examples, aspects of the operations of 1115 may be performed by an account association component 935 as described with reference to FIG. 9.

At 1120, the method may include—in response to the request—sending, for rendering at a second user device associated with the second user, a message including the channel invite for the second user to join the group-based communication channel. The channel invite may automatically be configured to correspond to the first account. The operations of 1120 may be performed in accordance with examples as disclosed herein. In some examples, aspects of the operations of 1120 may be performed by a channel invite component 940 as described with reference to FIG. 9.

Figure 12:
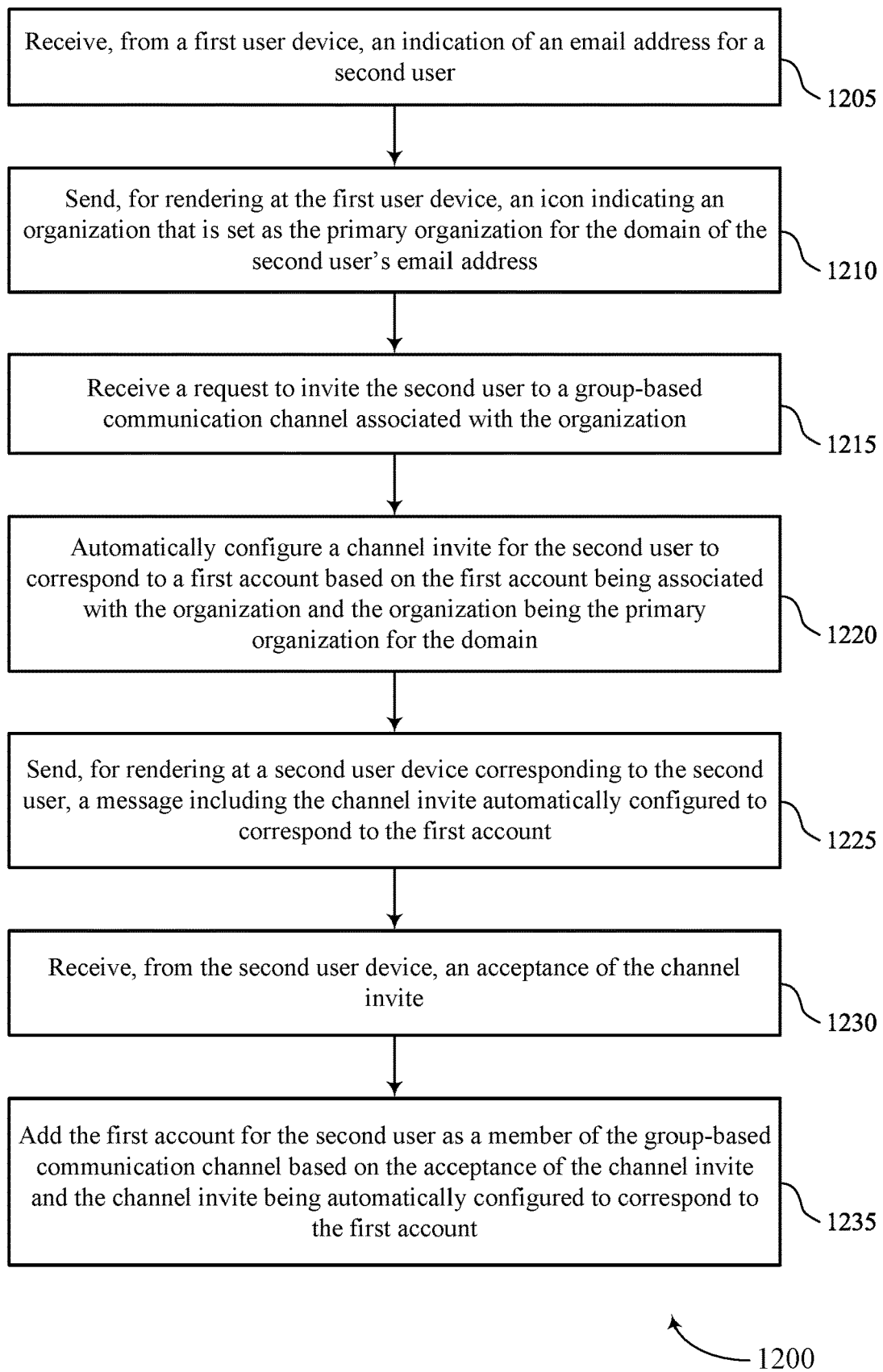

FIG. 12 shows a flowchart illustrating a method 1200 that supports domain and invite management in a group-based communication system in accordance with aspects of the present disclosure. The operations of the method 1200 may be implemented by a group-based communication platform or its components (e.g., a computing device, such as an application server, a database server, a cloud-based server or service, a worker server, a server cluster, a virtual machine, a container, or any combination of these or other computing devices) as described herein. For example, the operations of the method 1200 may be performed by a group-based communication platform as described with reference to FIGS. 1 through 10. In some examples, a group-based communication platform may execute a set of instructions to control the functional elements of the group-based communication platform to perform the described functions. Additionally, or alternatively, the group-based communication platform may perform aspects of the described functions using special-purpose hardware.

At 1205, the method may include receiving, from a first user device associated with a first user, an indication of an email address for a second user. The operations of 1205 may be performed in accordance with examples as disclosed herein. In some examples, aspects of the operations of 1205 may be performed by an email verification component 945 as described with reference to FIG. 9.

At 1210, the method may include—in response to the indication of the email address for the second user—sending, for rendering at the first user device, an icon indicating an organization that is set as a primary organization for a domain of the email address. The operations of 1210 may be performed in accordance with examples as disclosed herein. In some examples, aspects of the operations of 1210 may be performed by an email verification component 945 as described with reference to FIG. 9.

At 1215, the method may include receiving, from the first user device, a request to invite the second user to a group-based communication channel associated with the organization in the group-based communication system. The request may indicate the email address for the second user, and the second user may correspond to a set of multiple accounts in the group-based communication system. The operations of 1215 may be performed in accordance with examples as disclosed herein. In some examples, aspects of the operations of 1215 may be performed by an invite request component 925 as described with reference to FIG. 9.

At 1220, the method may include automatically configuring a channel invite for the second user to correspond to a first account of the set of multiple accounts based on the first account being associated with the organization and the organization being set as the primary organization for the domain of the email address. The operations of 1220 may be performed in accordance with examples as disclosed herein. In some examples, aspects of the operations of 1220 may be performed by an account association component 935 as described with reference to FIG. 9.

At 1225, the method may include—in response to the request—sending, for rendering at a second user device associated with the second user, a message including the channel invite for the second user to join the group-based communication channel, the channel invite automatically configured to correspond to the first account. The operations of 1225 may be performed in accordance with examples as disclosed herein. In some examples, aspects of the operations of 1225 may be performed by a channel invite component 940 as described with reference to FIG. 9.

At 1230, the method may include—in response to the message including the channel invite—receiving, from the second user device, an acceptance of the channel invite. The operations of 1230 may be performed in accordance with examples as disclosed herein. In some examples, aspects of the operations of 1230 may be performed by an invite acceptance component 950 as described with reference to FIG. 9.

At 1235, the method may include adding the first account for the second user as a member of the group-based communication channel based on the acceptance of the channel invite and the channel invite being automatically configured to correspond to the first account. The operations of 1235 may be performed in accordance with examples as disclosed herein. In some examples, aspects of the operations of 1235 may be performed by an account association component 935 as described with reference to FIG. 9.

A method for domain management for a group-based communication system is described. The method may include receiving, from a first user device associated with a first user, a request to invite a second user to a group-based communication channel associated with an organization in the group-based communication system, the request indicating an email address for the second user, and the second user corresponding to a set of multiple accounts in the group-based communication system, determining that the organization is set as a primary organization for a domain of the email address in the group-based communication system, automatically configuring a channel invite for the second user to correspond to a first account of the set of multiple accounts based on the first account being associated with the organization and the organization being set as the primary organization for the domain, and in response to the request, sending, for rendering at a second user device associated with the second user, a message including the channel invite for the second user to join the group-based communication channel, the channel invite automatically configured to correspond to the first account.

An apparatus for domain management for a group-based communication system is described. The apparatus may include a processor, memory coupled with the processor, and instructions stored in the memory. The instructions may be executable by the processor to cause the apparatus to receive, from a first user device associated with a first user, a request to invite a second user to a group-based communication channel associated with an organization in the group-based communication system, the request indicating an email address for the second user, and the second user corresponding to a set of multiple accounts in the group-based communication system, determine that the organization is set as a primary organization for a domain of the email address in the group-based communication system, automatically configure a channel invite for the second user to correspond to a first account of the set of multiple accounts based on the first account being associated with the organization and the organization being set as the primary organization for the domain, and in response to the request, send, for rendering at a second user device associated with the second user, a message including the channel invite for the second user to join the group-based communication channel, the channel invite automatically configured to correspond to the first account.

Another apparatus for domain management for a group-based communication system is described. The apparatus may include means for receiving, from a first user device associated with a first user, a request to invite a second user to a group-based communication channel associated with an organization in the group-based communication system, the request indicating an email address for the second user, and the second user corresponding to a set of multiple accounts in the group-based communication system, means for determining that the organization is set as a primary organization for a domain of the email address in the group-based communication system, means for automatically configuring a channel invite for the second user to correspond to a first account of the set of multiple accounts based on the first account being associated with the organization and the organization being set as the primary organization for the domain, and means for in response to the request, sending, for rendering at a second user device associated with the second user, a message including the channel invite for the second user to join the group-based communication channel, the channel invite automatically configured to correspond to the first account.

A non-transitory computer-readable medium storing code for domain management for a group-based communication system is described. The code may include instructions executable by a processor to receive, from a first user device associated with a first user, a request to invite a second user to a group-based communication channel associated with an organization in the group-based communication system, the request indicating an email address for the second user, and the second user corresponding to a set of multiple accounts in the group-based communication system, determine that the organization is set as a primary organization for a domain of the email address in the group-based communication system, automatically configure a channel invite for the second user to correspond to a first account of the set of multiple accounts based on the first account being associated with the organization and the organization being set as the primary organization for the domain, and in response to the request, send, for rendering at a second user device associated with the second user, a message including the channel invite for the second user to join the group-based communication channel, the channel invite automatically configured to correspond to the first account.

Some examples of the method, apparatuses, and non-transitory computer-readable medium described herein may further include operations, features, means, or instructions for receiving, from the first user device, an indication of the email address for the second user and in response to the indication of the email address for the second user, sending, for rendering at the first user device, an icon indicating the organization that may be set as the primary organization for the domain of the email address.

In some examples of the method, apparatuses, and non-transitory computer-readable medium described herein, in response to the message including the channel invite, receiving, from the second user device, an acceptance of the channel invite and adding the first account for the second user as a member of the group-based communication channel based on the acceptance of the channel invite and the channel invite being automatically configured to correspond to the first account.

Some examples of the method, apparatuses, and non-transitory computer-readable medium described herein may further include operations, features, means, or instructions for applying, to the first account for the second user, one or more settings, one or more policies, one or more security parameters, one or more compliance parameters, or a combination thereof corresponding to the organization based on the first account being associated with the organization.

Some examples of the method, apparatuses, and non-transitory computer-readable medium described herein may further include operations, features, means, or instructions for assigning the first account as a primary account for the second user in the group-based communication system based on the first account being associated with the organization that may be set as the primary organization for the domain of the email address for the second user.

Some examples of the method, apparatuses, and non-transitory computer-readable medium described herein may further include operations, features, means, or instructions for storing, for the organization, one or more domains claimed by the organization and validating that the organization owns the one or more domains claimed by the organization, where the one or more domains includes the domain of the email address for the second user.

In some examples of the method, apparatuses, and non-transitory computer-readable medium described herein, the validating may include operations, features, means, or instructions for generating a string value for validating the domain, sending, to a third user device associated with a third user of the organization, the generated string value, and determining that the organization owns the domain based on a domain name service record for the domain including the generated string value sent to the third user device.

In some examples of the method, apparatuses, and non-transitory computer-readable medium described herein, storing the one or more domains claimed by the organization may include operations, features, means, or instructions for storing, for the organization, a set of multiple sub-domains claimed by the organization based on a partial domain name and a wildcard character.

Some examples of the method, apparatuses, and non-transitory computer-readable medium described herein may further include operations, features, means, or instructions for receiving, from a third user device associated with a third user of the organization, a user input selecting the organization as the primary organization for the domain of the email address in the group-based communication system.

Some examples of the method, apparatuses, and non-transitory computer-readable medium described herein may further include operations, features, means, or instructions for restricting a second account of the set of multiple accounts from accepting the channel invite based on the second account being unassociated with the organization that may be set as the primary organization for the domain of the email address.

The following provides an overview of aspects of the present disclosure:

Aspect 1: A method for domain management for a group-based communication system, comprising: receiving, from a first user device associated with a first user, a request to invite a second user to a group-based communication channel associated with an organization in the group-based communication system, the request indicating an email address for the second user, and the second user corresponding to a plurality of accounts in the group-based communication system; determining that the organization is set as a primary organization for a domain of the email address in the group-based communication system; automatically configuring a channel invite for the second user to correspond to a first account of the plurality of accounts based at least in part on the first account being associated with the organization and the organization being set as the primary organization for the domain; and in response to the request, sending, for rendering at a second user device associated with the second user, a message comprising the channel invite for the second user to join the group-based communication channel, the channel invite automatically configured to correspond to the first account.

Aspect 2: The method of aspect 1, further comprising: receiving, from the first user device, an indication of the email address for the second user; and in response to the indication of the email address for the second user, sending, for rendering at the first user device, an icon indicating the organization that is set as the primary organization for the domain of the email address.

Aspect 3: The method of any of aspects 1 through 2, further comprising: in response to the message comprising the channel invite, receiving, from the second user device, an acceptance of the channel invite; and adding the first account for the second user as a member of the group-based communication channel based at least in part on the acceptance of the channel invite and the channel invite being automatically configured to correspond to the first account.

Aspect 4: The method of any of aspects 1 through 3, further comprising: applying, to the first account for the second user, one or more settings, one or more policies, one or more security parameters, one or more compliance parameters, or a combination thereof corresponding to the organization based at least in part on the first account being associated with the organization.

Aspect 5: The method of any of aspects 1 through 4, further comprising: assigning the first account as a primary account for the second user in the group-based communication system based at least in part on the first account being associated with the organization that is set as the primary organization for the domain of the email address for the second user.

Aspect 6: The method of any of aspects 1 through 5, further comprising: storing, for the organization, one or more domains claimed by the organization; and validating that the organization owns the one or more domains claimed by the organization, wherein the one or more domains comprises the domain of the email address for the second user.

Aspect 7: The method of aspect 6, wherein the validating comprises: generating a string value for validating the domain; sending, to a third user device associated with a third user of the organization, the generated string value; and determining that the organization owns the domain based at least in part on a domain name service record for the domain comprising the generated string value sent to the third user device.

Aspect 8: The method of any of aspects 6 through 7, wherein storing the one or more domains claimed by the organization comprises: storing, for the organization, a plurality of sub-domains claimed by the organization based at least in part on a partial domain name and a wildcard character.

Aspect 9: The method of any of aspects 1 through 8, further comprising: receiving, from a third user device associated with a third user of the organization, a user input selecting the organization as the primary organization for the domain of the email address in the group-based communication system.

Aspect 10: The method of any of aspects 1 through 9, further comprising: restricting a second account of the plurality of accounts from accepting the channel invite based at least in part on the second account being unassociated with the organization that is set as the primary organization for the domain of the email address.

Aspect 11: An apparatus for domain management for a group-based communication system, comprising a processor; memory coupled with the processor; and instructions stored in the memory and executable by the processor to cause the apparatus to perform a method of any of aspects 1 through 10.

Aspect 12: An apparatus for domain management for a group-based communication system, comprising at least one means for performing a method of any of aspects 1 through 10.

Aspect 13: A non-transitory computer-readable medium storing code for domain management for a group-based communication system, the code comprising instructions executable by a processor to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for domain management for a group-based communication system, comprising:

receiving, from a first user device associated with a first user, a request to invite a second user to a group-based communication channel associated with an organization in the group-based communication system, the request indicating an email address of the second user, wherein the email address of the second user is a single email address corresponding to a plurality of accounts stored for the second user in the group-based communication system, the plurality of accounts is associated with a plurality of different security policies, and an account of the plurality of accounts is associated with a respective organization of a plurality of organizations in the group-based communication system and a respective security policy of the plurality of different security policies;

determining that the organization associated with the group-based communication channel is set as a primary organization for a domain of the email address of the second user in the group-based communication system based at least in part on a first account of the plurality of accounts stored for the second user being associated with the organization;

automatically configuring a channel invite for the second user to correspond to the first account of the plurality of accounts stored for the second user based at least in part on the first account being associated with the organization, the organization being set as the primary organization for the domain of the email address of the second user, and the first account being associated with a first security policy of the plurality of different security policies; and in response to the request, sending, for rendering at a second user device associated with the second user, a message to the email address of the second user indicated by the request from the first user, the message comprising the channel invite for the second user to join the group-based communication channel, wherein the channel invite is automatically configured to correspond to the first account of the plurality of accounts stored for the second user.

2. The method of claim 1, further comprising:

storing, for the organization, one or more domains claimed by the organization; and validating that the organization owns the one or more domains claimed by the organization, wherein the one or more domains comprises the domain of the email address of the second user.

3. The method of claim 2, wherein validating that the organization owns the one or more domains comprises:

generating a string value for validating the domain of the email address of the second user;

sending, to a third user device associated with a third user of the organization, the generated string value; and determining that the organization owns the domain of the email address of the second user based at least in part on a domain name service record for the domain comprising the generated string value sent to the third user device.

4. The method of claim 2, wherein storing the one or more domains claimed by the organization comprises:

storing, for the organization, a plurality of sub-domains claimed by the organization based at least in part on a partial domain name and a wildcard character.

5. The method of claim 1, further comprising:

receiving, from the first user device, an indication of the email address of the second user; and in response to the indication of the email address of the second user, sending, for rendering at the first user device, an icon indicating the organization that is set as the primary organization for the domain of the email address of the second user.

6. The method of claim 1, further comprising:

in response to the message comprising the channel invite, receiving, from the second user device, an acceptance of the channel invite; and adding the first account of the plurality of accounts stored for the second user as a member of the group-based communication channel based at least in part on the acceptance of the channel invite and the channel invite being automatically configured to correspond to the first account.

7. The method of claim 1, further comprising:

applying, to the first account of the plurality of accounts stored for the second user, one or more settings, one or more policies, one or more security parameters, one or more compliance parameters, or a combination thereof corresponding to the organization based at least in part on the first account being associated with the organization and the first account being associated with the first security policy.

8. The method of claim 1, further comprising:

assigning the first account of the plurality of accounts as a primary account for the second user in the group-based communication system based at least in part on the first account being associated with the organization that is set as the primary organization for the domain of the email address of the second user.

9. The method of claim 1, further comprising:

receiving, from a third user device associated with a third user of the organization, a user input selecting the organization as the primary organization for the domain of the email address of the second user in the group-based communication system.

10. The method of claim 1, further comprising:

restricting a second account of the plurality of accounts stored for the second user from accepting the channel invite based at least in part on the second account being unassociated with the organization that is set as the primary organization for the domain of the email address of the second user.

11. An apparatus for domain management for a group-based communication system, comprising:

one or more processors;

one or more memories coupled with the one or more processors; and instructions stored in the one or more memories and executable by the one or more processors to cause the apparatus to:

receive, from a first user device associated with a first user, a request to invite a second user to a group-based communication channel associated with an organization in the group-based communication system, the request indicating an email address of the second user, wherein the email address of the second user is a single email address corresponding to a plurality of accounts stored for the second user in the group-based communication system, the plurality of accounts is associated with a plurality of different security policies, and an account of the plurality of accounts is associated with a respective organization of a plurality of organizations in the group-based communication system and a respective security policy of the plurality of different security policies;

determine that the organization associated with the group-based communication channel is set as a primary organization for a domain of the email address of the second user in the group-based communication system based at least in part on a first account of the plurality of accounts stored for the second user being associated with the organization;

automatically configure a channel invite for the second user to correspond to the first account of the plurality of accounts stored for the second user based at least in part on the first account being associated with the organization, the organization being set as the primary organization for the domain of the email address of the second user, and the first account being associated with a first security policy of the plurality of different security policies; and in response to the request, send, for rendering at a second user device associated with the second user, a message to the email address of the second user indicated by the request from the first user, the message comprising the channel invite for the second user to join the group-based communication channel, wherein the channel invite is automatically configured to correspond to the first account of the plurality of accounts stored for the second user.

12. The apparatus of claim 11, wherein the instructions are further executable by the one or more processors to cause the apparatus to:

receive, from the first user device, an indication of the email address of the second user; and in response to the indication of the email address of the second user, send, for rendering at the first user device, an icon indicating the organization that is set as the primary organization for the domain of the email address of the second user.

13. The apparatus of claim 11, wherein the instructions are further executable by the one or more processors to cause the apparatus to:

in response to the message comprising the channel invite, receive, from the second user device, an acceptance of the channel invite; and add the first account of the plurality of accounts stored for the second user as a member of the group-based communication channel based at least in part on the acceptance of the channel invite and the channel invite being automatically configured to correspond to the first account.

14. The apparatus of claim 11, wherein the instructions are further executable by the one or more processors to cause the apparatus to:

apply, to the first account of the plurality of accounts stored for the second user, one or more settings, one or more policies, one or more security parameters, one or more compliance parameters, or a combination thereof corresponding to the organization based at least in part on the first account being associated with the organization and the first account being associated with the first security policy.

15. The apparatus of claim 11, wherein the instructions are further executable by the one or more processors to cause the apparatus to:

assign the first account of the plurality of accounts as a primary account for the second user in the group-based communication system based at least in part on the first account being associated with the organization that is set as the primary organization for the domain of the email address of the second user.

16. A non-transitory computer-readable medium storing code for domain management for a group-based communication system, the code comprising instructions executable by one or more processors to:

receive, from a first user device associated with a first user, a request to invite a second user to a group-based communication channel associated with an organization in the group-based communication system, the request indicating an email address of the second user, wherein the email address of the second user is a single email address corresponding to a plurality of accounts stored for the second user in the group-based communication system, the plurality of accounts is associated with a plurality of different security policies, and an account of the plurality of accounts is associated with a respective organization of a plurality of organizations in the group-based communication system and a respective security policy of the plurality of different security policies;

determine that the organization associated with the group-based communication channel is set as a primary organization for a domain of the email address of the second user in the group-based communication system based at least in part on a first account of the plurality of accounts stored for the second user being associated with the organization;

automatically configure a channel invite for the second user to correspond to the first account of the plurality of accounts stored for the second user based at least in part on the first account being associated with the organization, the organization being set as the primary organization for the domain of the email address of the second user, and the first account being associated with a first security policy of the plurality of different security policies; and in response to the request, send, for rendering at a second user device associated with the second user, a message to the email address of the second user indicated by the request from the first user, the message comprising the channel invite for the second user to join the group-based communication channel, wherein the channel invite is automatically configured to correspond to the first account of the plurality of accounts stored for the second user.

17. The non-transitory computer-readable medium of claim 16, wherein the instructions are further executable by the one or more processors to:

receive, from the first user device, an indication of the email address of the second user; and in response to the indication of the email address of the second user, send, for rendering at the first user device, an icon indicating the organization that is set as the primary organization for the domain of the email address of the second user.

18. The non-transitory computer-readable medium of claim 16, wherein the instructions are further executable by the one or more processors to:

in response to the message comprising the channel invite, receive, from the second user device, an acceptance of the channel invite; and add the first account of the plurality of accounts stored for the second user as a member of the group-based communication channel based at least in part on the acceptance of the channel invite and the channel invite being automatically configured to correspond to the first account.

19. The non-transitory computer-readable medium of claim 16, wherein the instructions are further executable by the one or more processors to:

apply, to the first account of the plurality of accounts stored for the second user, one or more settings, one or more policies, one or more security parameters, one or more compliance parameters, or a combination thereof corresponding to the organization based at least in part on the first account being associated with the organization and the first account being associated with the first security policy.

20. The non-transitory computer-readable medium of claim 16, wherein the instructions are further executable by the one or more processors to:

assign the first account of the plurality of accounts as a primary account for the second user in the group-based communication system based at least in part on the first account being associated with the organization that is set as the primary organization for the domain of the email address of the second user.

* * * * *